United States Patent
Benedetto et al.

(10) Patent No.: US 12,420,207 B2
(45) Date of Patent: *Sep. 23, 2025

(54) MARKER IN A MESSAGE PROVIDING ACCESS TO A FULL VERSION OF A VIDEO GAME

(71) Applicant: Sony Interactive Entertainment LLC, San Mateo, CA (US)

(72) Inventors: Warren Benedetto, San Mateo, CA (US); Landon Noss, San Mateo, CA (US); Adil Sherwani, San Mateo, CA (US); Akihiko Kusumoto, San Mateo, CA (US); Nicole Hayashida, San Mateo, CA (US); Justin Lancaster, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/834,750

(22) Filed: Jun. 7, 2022

(65) Prior Publication Data

US 2022/0297016 A1    Sep. 22, 2022

Related U.S. Application Data

(63) Continuation of application No. 15/476,110, filed on Mar. 31, 2017, now Pat. No. 11,351,468, which is a
(Continued)

(51) Int. Cl.
*A63F 13/88* (2014.01)
*A63F 13/216* (2014.01)
(Continued)

(52) U.S. Cl.
CPC ............. *A63F 13/88* (2014.09); *A63F 13/216* (2014.09); *A63F 13/47* (2014.09); *A63F 13/63* (2014.09); *A63F 13/69* (2014.09); *A63F 13/87* (2014.09)

(58) Field of Classification Search
CPC ........ A63F 13/87; A63F 13/216; A63F 13/31; A63F 13/50; A63F 13/58
See application file for complete search history.

(56) References Cited

U.S. PATENT DOCUMENTS

| | | | |
|---|---|---|---|
| 2014/0179424 A1* | 6/2014 | Perry | A63F 13/60 463/31 |
| 2014/0187314 A1 | 7/2014 | Perry et al. | |
| 2015/0375102 A1* | 12/2015 | George | A63F 13/00 463/24 |

FOREIGN PATENT DOCUMENTS

| | | |
|---|---|---|
| CN | 103885768 A | 6/2014 |
| CN | 103888440 A | 6/2014 |

(Continued)

*Primary Examiner* — Yingchuan Zhang
(74) *Attorney, Agent, or Firm* — Kilpatrick Townsend & Stockton LLP

(57) ABSTRACT

A method for gaming interaction. The method including capturing a plurality of snapshots generated from a gaming application executed for a first user. The method including generating a user defined package according to parameter information provided by the first user through a first companion interface of a first computing device of the first user, wherein the parameter information is based on one or more snapshots of the plurality of snapshots. The method including generating a marker for the user defined package. The method including providing the marker for display on a second computing device of a second user, wherein the marker enables access to the user defined package.

20 Claims, 13 Drawing Sheets

Related U.S. Application Data continuation-in-part of application No. 15/411,421, filed on Jan. 20, 2017, now Pat. No. 11,794,108.

(60) Provisional application No. 62/375,834, filed on Aug. 16, 2016, provisional application No. 62/365,202, filed on Jul. 21, 2016, provisional application No. 62/349,546, filed on Jun. 13, 2016.

(51) Int. Cl.
*A63F 13/47* (2014.01)
*A63F 13/63* (2014.01)
*A63F 13/69* (2014.01)
*A63F 13/87* (2014.01)

(56) References Cited

FOREIGN PATENT DOCUMENTS

| | | |
|---|---|---|
| CN | 103902806 A | 7/2014 |
| CN | 104640608 A | 5/2015 |

\* cited by examiner

MARKER IN A MESSAGE PROVIDING ACCESS TO A FULL VERSION OF A VIDEO GAME

CLAIM OF PRIORITY

The present application is a continuation of and claims priority to and the benefit of the commonly owned, patent application U.S. Ser. No. 15/476,110, filed on Mar. 31, 2017, entitled "GENERATING CHALLENGES USING A LOCATION BASED GAME PLAY COMPANION APPLICATION"; which claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," all of which are herein incorporated by reference in their entireties for all purposes.

The present application is a continuation of and claims priority to and the benefit of the commonly owned, patent application U.S. Ser. No. 15/476,110, filed on Mar. 31, 2017, entitled "GENERATING CHALLENGES USING A LOCATION BASED GAME PLAY COMPANION APPLICATION"; which is a continuation-in-part of and claims priority to and the benefit of the commonly owned, patent application U.S. Ser. No. 15/411,421, filed on Jan. 20, 2017, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," all of which are herein incorporated by reference in their entireties for all purposes.

The present application is a continuation of and claims priority to and the benefit of the commonly owned, patent application U.S. Ser. No. 15/476,110, filed on Mar. 31, 2017, entitled "GENERATING CHALLENGES USING A LOCATION BASED GAME PLAY COMPANION APPLICATION"; which claims priority to and the benefit of the commonly owned, provisional patent application, U.S. Ser. No. 62/375,834, filed on Aug. 16, 2016, entitled "METHOD AND SYSTEM FOR ACCESSING PREVIOUSLY STORED GAME PLAY VIA VIDEO RECORDING AS EXECUTED ON A GAME CLOUD SYSTEM," all of which are herein incorporated by reference in their entireties for all purposes.

The present application is a continuation of and claims priority to and the benefit of the commonly owned, patent application U.S. Ser. No. 15/476,110, filed on Mar. 31, 2017, entitled "GENERATING CHALLENGES USING A LOCATION BASED GAME PLAY COMPANION APPLICATION"; which claims priority to and the benefit of the commonly owned, provisional patent application, U.S. Ser. No. 62/365,202, filed on Jul. 21, 2016, entitled "GAME PLAY COMPANION APPLICATION," all of which are herein incorporated by reference in their entireties for all purposes.

CROSS REFERENCE TO RELATED APPLICATIONS

This application is related to commonly assigned, co-pending U.S. patent application Ser. No. 13/779,730, entitled "SYSTEMS AND METHODS FOR TAGGING CONTENT OF SHARED CLOUD EXECUTED MINI-GAMES AND TAG SHARING CONTROLS," filed on Feb. 27, 2013, the disclosure of which is hereby incorporated by reference in its entirety. This application is related to commonly assigned, co-pending U.S. patent application Ser. No. 13/792,664, entitled "USER-BASED MINI-GAME GENERATION AND DISTRIBUTION," filed on Mar. 11, 2013, the disclosure of which is hereby incorporated by reference in its entirety. This application is related to commonly assigned U.S. Pat. No. 8,870,661, entitled "CLOUD-BASED GAME SLICE GENERATION AND FRICTIONLESS SOCIAL SHARING WITH INSTANT PLAY," filed on Mar. 12, 2013, the disclosure of which is hereby incorporated by reference in its entirety. This application is related to commonly assigned, co-pending U.S. patent application Ser. No. 13/844,558, entitled "Systems and Methods for Managing Video Game Titles and User Play Metrics for Video Game Titles Executing on a Game Cloud System," filed on Mar. 15, 2013, the disclosure of which is hereby incorporated by reference in its entirety. This application is related to commonly assigned, co-pending U.S. patent application Ser. No. 14/526,472, entitled "CLOUD-BASED GAME SLICE GENERATION AND FRICTIONLESS SOCIAL SHARING WITH INSTANT PLAY," filed on Oct. 28, 2014, the disclosure of which is hereby incorporated by reference in its entirety.

TECHNICAL FIELD

The present disclosure is related to video games or gaming applications. Among other things, this disclosure describes methods and systems for generating quests and/or challenges in a location based companion application supporting game play of a user playing a gaming application and for interacting with quests and/or challenges.

BACKGROUND OF THE DISCLOSURE

Cloud-based systems, using computing resources (hardware and software), deliver services over a network (e.g., the internet). The services, in the context of gaming, enable streaming of content to remote clients, wherein most processing is done on servers, which may be distributed. In some cases, the video game is executing in a cloud-based system, wherein input provided at the remote clients will in turn drive execution of the video game, without the need for dedicated gaming hardware at the client's location. Cloud-based processing and gaming, therefore, has been increasing in popularity because users find it easier to access more video game titles without complex hardware restrictions, and game suppliers find it easier to manage game code from centralized locations. Also, the higher processing power of the cloud servers allows video games to become more complex and expansive.

A video game may include one or more mini-games for user interaction. A mini-game may or may not be related to the video game. For example, a mini-game may be played by a user to advance the video game, such as: obtaining special weaponry that can be used within the video game, gaining extra points, replenishing life, bonus stages, secret levels, etc. Some mini-games are played purely for the enjoyment of the user and may or may not progress the user through the video game. For instance, a mini-game may be an addicting puzzle with minimal graphics that is designed for the user to pass the time away, without any relation to the video game.

However, these mini-games are developed within the confines of their corresponding video games. That is, only a static amount of mini-games may be created for a corresponding video game, and creation of mini-games end once the video game is fully developed. Because the mini-games are created by the developers within the code of the video game, the resulting mini-games may be limited in number and scope by the range of creativity of the developers, time constraints, and manpower constraints.

It is in this context that embodiments of the disclosure arise.

SUMMARY

Embodiments of the present disclosure relate generating quests and/or challenges in a location based companion interface supporting game play of a user playing a gaming application. Several inventive embodiments of the present disclosure are described below.

In one embodiment, a method for gaming interaction is disclosed. The method includes capturing a plurality of snapshots generated from a gaming application executed for a first user. The method includes generating a user defined package according to parameter information provided by the first user through a first companion interface of a first computing device of the first user, wherein the parameter information is based on one or more snapshots of the plurality of snapshots. The method includes generating a marker for the user defined package. The method includes providing the marker for display on a second computing device of a second user, wherein the marker enables access to the user defined package.

In another embodiment, a non-transitory computer-readable medium storing a computer program for gaming interaction is disclosed. The computer-readable medium includes program instructions for capturing a plurality of snapshots generated from a gaming application executed for a first user. The computer-readable medium includes program instructions for generating a user defined package according to parameter information provided by the first user through a first companion interface of a first computing device of the first user, wherein the parameter information is based on one or more snapshots of the plurality of snapshots. The computer-readable medium includes program instructions for generating a marker for the user defined package. The computer-readable medium includes program instructions for providing the marker for display on a second computing device of a second user, wherein the marker enables access to the user defined package.

In still another embodiment, a computer system is disclosed, the computer system including a processor and memory, wherein the memory is coupled to the processor and having stored therein instructions that, if executed by the computer system, cause the computer system to execute a method for gaming interaction. The method includes generating a user defined package according to parameter information provided by the first user through a first companion interface of a first computing device of the first user, wherein the parameter information is based on one or more snapshots of the plurality of snapshots. The method includes generating a marker for the user defined package. The method includes providing the marker for display on a second computing device of a second user, wherein the marker enables access to the user defined package.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
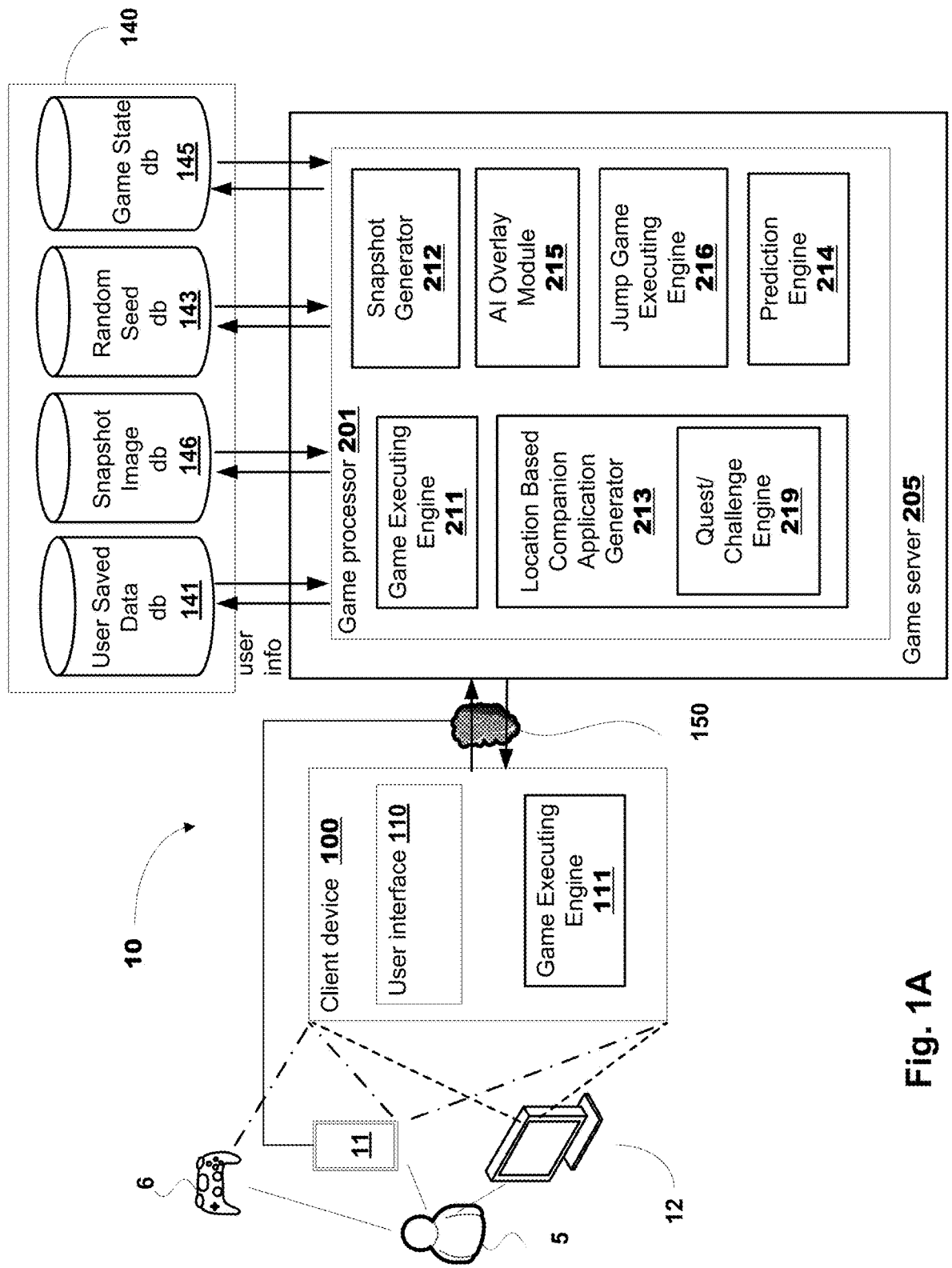
FIG. 1A illustrates a system used for implementing a location based companion interface supporting game play of a corresponding user, wherein the gaming application can be executing on a local computing device or over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing a location based companion interface that is configured to support game play of a user, wherein the companion interface is configured to generate quests and/or challenges based on the game play but not contained within the gaming application. Embodiments of the present disclosure provide for additional uses of a gaming application through a location based companion interface. The companion interface includes contextually relevant information (e.g., messaging, assistance information, etc.) that is generated based on a location of a character in the game play of the user. The information is based on snapshots collected periodically during the game play of one or more users, wherein a snapshot contains metadata and/or information about the game play of the corresponding user, and is configurable to enable another instance of a corresponding gaming application at a jump point in the gaming application corresponding to the snapshot. In addition, the companion interface is configurable to allow the user to generate quests and/or challenges based on the game play of the user (e.g., information contained in the snapshots). These quests and/or challenges are newly created after the development of the corresponding gaming application, thereby allowing for continual generation of a wide range of quests and/or challenges with each new user playing the gaming application. Further, the quests and/or challenges can be played by any user within the context or outside the context of playing the corresponding gaming application. The quests and/or challenges may be targeted to friends of the user, such as by invitation through a companion interface, messaging, email, etc. The quests and/or challenges may also be made available to the general public, such as through a gaming server, website, invitation, messaging, etc.

The location based information includes defining parameters generated for snapshots collected periodically during the game play of the user. In particular, a snapshot contains metadata and/or information about the game play of the user, and is configurable to enable another instance of a corresponding gaming application at a jump point in the gaming application corresponding to the snapshot. The contextually relevant information also includes information collected during that game plays of other users playing the same gaming application. In that manner, the user is able to receive contextually relevant information based on the current progress of the user (e.g., location in gaming world, etc.). For example, the contextually relevant information can provide assistance in the game play of the user, wherein the information may be based on game play location, past game play, and anticipated game play. Further, the companion interface can be used to create messages from the user.

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 10 used for implementing a location based companion interface configured to support game play of a user playing a gaming application and used for the generation of quests and/or challenges based on the game play of the gaming application, wherein the gaming application can be executing on a local computing device or over a cloud game network, in accordance with one embodiment of the present disclosure. The companion interface may be used for creating content (e.g., quests and/or challenges, etc.) for interaction by other users playing the gaming application. A quest and/or challenge is created based on location based information captured during game play of the user playing a gaming application, such as snapshot information.

As shown in FIG. 1A, the gaming application may be executing locally at a client device 100 of the user 5, or may be executing at a back-end game executing engine 211 operating at a back-end game server 205 of a cloud game network or game cloud system. The game executing engine 211 may be operating within one of many game processors 201 of game server 205. In either case, the cloud game network is configured to provide a location based companion interface supporting the game plays of one or more users playing a gaming application. Further, the gaming application may be executing in a single-player mode, or multi-player mode, wherein embodiments of the present invention provide for multi-player enhancements (e.g., assistance, communication, etc.) to both modes of operation.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to provide a companion interface displayable to user 5 for purposes of generating and/or receiving contextually relevant information, as will be further described below.

Client device 100 is configured for requesting access to a gaming application over a network 150, such as the internet, and for rendering instances of video games or gaming applications executed by the game server 205 and delivered to the display device 12 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Client device 100 is configured for receiving rendered images, and for displaying the rendered images on display 12. For example, through cloud based services the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play.

Further, client device 100 is configured to interact with the game server 205 to capture and store snapshots of the game play of user 5 when playing a gaming application, wherein each snapshot includes information (e.g., game state, etc.) related to the game play. For example, the snapshot may include location based information corresponding to a location of a character within a gaming world of the game play of the user 5. Further, a snapshot enables a corresponding user to jump into a saved game play at a jump point in the gaming application corresponding to the capture of the snapshot. As such, user 5 can jump into his or her own saved game play at a jump point corresponding to a selected snapshot, another user may jump into the game play of the user 5, or user 5 may jump into the saved game play of another user at a jump point corresponding to a selected snapshot. Further, client device 100 is configured to interact with game server 205 to display a location based companion interface from the companion interface generator 213, wherein the companion interface is configured to receive and/or generate contextually relevant content, such as assistance information, messaging, interactive quests and challenges, etc. In particular, information contained in the snapshots captured during the game play of user 5, such as location based information relating to the game play, as well as information captured during game plays of other users, is used to generate the contextually relevant content.

More particularly, game processor 201 of game server 205 is configured to generate and/or receive snapshots of the game play of user 5 when playing the gaming application. For instance, snapshots may be generated by the local game execution engine 111 on client device 100, outputted and delivered over network 150 to game processor 201. In addition, snapshots may be generated by game executing engine 211 within the game processor 201, such as by an instance of the gaming application executing on engine 211. In addition, other game processors of game server 205 associated with other virtual machines are configured to execute instances of the gaming application associated with game plays of other users and to capture snapshots during those game play, wherein this additional information may be used to create the contextually relevant information.

Snapshot generator 212 is configured to capture a plurality of snapshots generated from the game play of user 5. Each snapshot provides information that enables execution of an instance of the video game beginning from a point in the video game associated with a corresponding snapshot. The snapshots are automatically generated during game play of the gaming application by user 5. Portions of each of the snapshots are stored in relevant databases independently configured or configured under data store 140, in embodiments. In another embodiment, snapshots may be generated manually through instruction by user 5. In that manner, any user through selection of a corresponding snapshot may jump into the game play of user 5 at a point in the gaming application associated with the corresponding snapshot. In addition, snapshots of game plays of other users playing a plurality of gaming applications may also be captured. As such, game processor 201 is configured to access information in database 140 in order to enable the jumping into a saved game play of any user based on a corresponding snapshot. That is, the requesting user is able to begin playing the video game at a jump point corresponding to a selected snapshot using the game characters of the original user's game play that generated and saved the snapshot.

A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which was previously incorporated by reference in its entirety. A brief description of the creation and implementation of snapshots follows below.

In particular, each snapshot includes metadata and/or information to enable execution of an instance of the gaming application beginning at a point in the gaming application corresponding to the snapshot. For example, in the game play of user 5, a snapshot may be generated at a particular point in the progression of the gaming application, such as in the middle of a level. The relevant snapshot information is stored in one or more databases of database 140. Pointers can be used to relate information in each database corresponding to a particular snapshot. In that manner, another user wishing to experience the game play of user 5, or the same user 5 wishing to re-experience his or her previous game play, may select a snapshot corresponding to a point in the gaming application of interest.

The metadata and information in each snapshot may provide and/or be analyzed to provide additional information related to the game play of the user. For example, snapshots may help determine where the user (e.g., character of the user) has been within the gaming application, where the user is in the gaming application, what the user has done, what assets and skills the user has accumulated, and where the user will be going within the gaming application. This additional information may be used to generate quests and/or challenges that are based on the game play of the user, wherein the quests and/or challenges are not contained within the gaming application. For example, the user may define asset and achievement parameters (e.g., negative and positive) that create a quest and/or challenge that mimic the user's game play (e.g., beating the boss using minimal weaponry). The user may challenge other users to try and beat the quest (e.g., beating the boss) with the same constraints (e.g., minimal weaponry).

The snapshot includes a snapshot image of the scene that is rendered at that point. The snapshot image is stored in snapshot image database 146. The snapshot image presented in the form of a thumbnail in a timeline provides a view into the game play of a user at a corresponding point in the progression by the user through a video game.

More particularly, the snapshot also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot. The game state data is stored in game state database 145.

The snapshot also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141.

In addition, the snapshot also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects may be generated and presented in an overlay. For instance, clouds in the background and birds flying through space may be generated and presented in an overlay. The random seed data is stored in random seed database 143.

In that manner, another user wishing to experience the game play of user 5 may select a snapshot corresponding to a point in the video game of interest. For example, selection of a snapshot image presented in a timeline or node in a node graph by a user enables the jump executing engine 216 of game processor 201 to access the corresponding snapshot, instantiate another instance of the video game based on the snapshot, and execute the video game beginning at a point in the video game corresponding to the snapshot. In that manner, the snapshot enables the requesting user to jump into the game play of user 5 at the point corresponding to the snapshot. In addition, user 5 may access game plays of other users or even access his or her own prior game play in the same or other gaming application using corresponding snapshots. In particular, selection of the snapshot by user 5 (e.g., in a timeline, or through a message, etc.) enables executing engine 216 to collect the snapshot (e.g., metadata and/or information) from the various databases (e.g., from database 140) in order to begin executing the corresponding gaming application at a point where the corresponding snapshot was captured in a corresponding gaming application.

Game processor 201 includes a location based companion application generator 213 configured to generate a companion interface supporting the game play of user 5 when playing a gaming application. The generator 213 can be used to create contextually relevant information (e.g., assistance information, messages, etc.) to be delivered to or received from user 5 that is based on the game play of the user 5, wherein the contextually relevant information is created using location based information (e.g., snapshots). The contextually relevant information may also be based on information collected from game plays of other users playing the gaming application. For example, in embodiments the location based information may be based on current and/or past game plays of multiple users playing the same gaming application in a crowd sourcing environment, such that the information may be determined through observation and/or analysis of the multiple game plays. In that manner, crowdsourced content may be discovered during the game plays, wherein the content may be helpful for other players playing the same gaming application, or provide an enhanced user experience to these other players. The contextually relevant information may be generated from friends of the user. The user may be playing the gaming application in isolation (e.g., playing alone), and receiving information through the companion interface that is helpful in advancing the game play of the first user, or for providing an enhanced user experience. The user may be playing with a group of friends all playing the gaming application simultaneously (e.g., in isolation or multi-player mode), wherein the information provides real-time interaction between the friends.

In particular, generator 213 is configurable to determine progress of the game play of user 5 for a particular gaming application (e.g., based on snapshots) for a particular context of the game play (e.g., current location of character, game state information, etc.), and determine contextually relevant information that may be delivered to a companion interface displayable on device 11 that is separate from a device displaying the game play of user 5. For example, the contextually relevant information may provide information providing assistance in progressing through the gaming application. The contextually relevant information may consider information provided by a prediction engine 214 that is configured to predict where the game play of user 5 will go, to include what areas a character will visit, what tasks are required to advance the game play, what assets are needed in order to advance the game play (e.g., assets needed to accomplish a required task), etc.

The companion interface may also be used to create contextually relevant content by user 5 for interaction by other users. For example, location based information shown in the companion interface (e.g., radar mapping, waypoints, etc.) may facilitate the creation of create interactive content (e.g., quests, challenges, messages, etc.), as implemented through the quest/challenge engine 219. That is, the user 5 may use location based information (e.g., snapshots) to create the interactive content (e.g., quests and/or challenges) that are based on the game play of the user but not contained within the gaming application. In particular, the quest and/or challenge may be defined by asset and achievement parameters based on information contained within snapshots captured during the game play of the user. Scope of these quests and/or challenges are only limited by the creativity of the present and future users playing the gaming application. In addition, engine 219 facilitates interaction with these quests/challenges.

As shown, the companion interface is delivered to a device 11 (e.g., tablet) for display and interaction, wherein device 11 may be separate from client device 100 that is configured to execute and/or support execution of the gaming application for user 5 interaction. For instance, a first communication channel may be established between the game server 205 and client device 100, and a separate, second communication channel may be established between game server 205 and device 11.

Figure 1B:
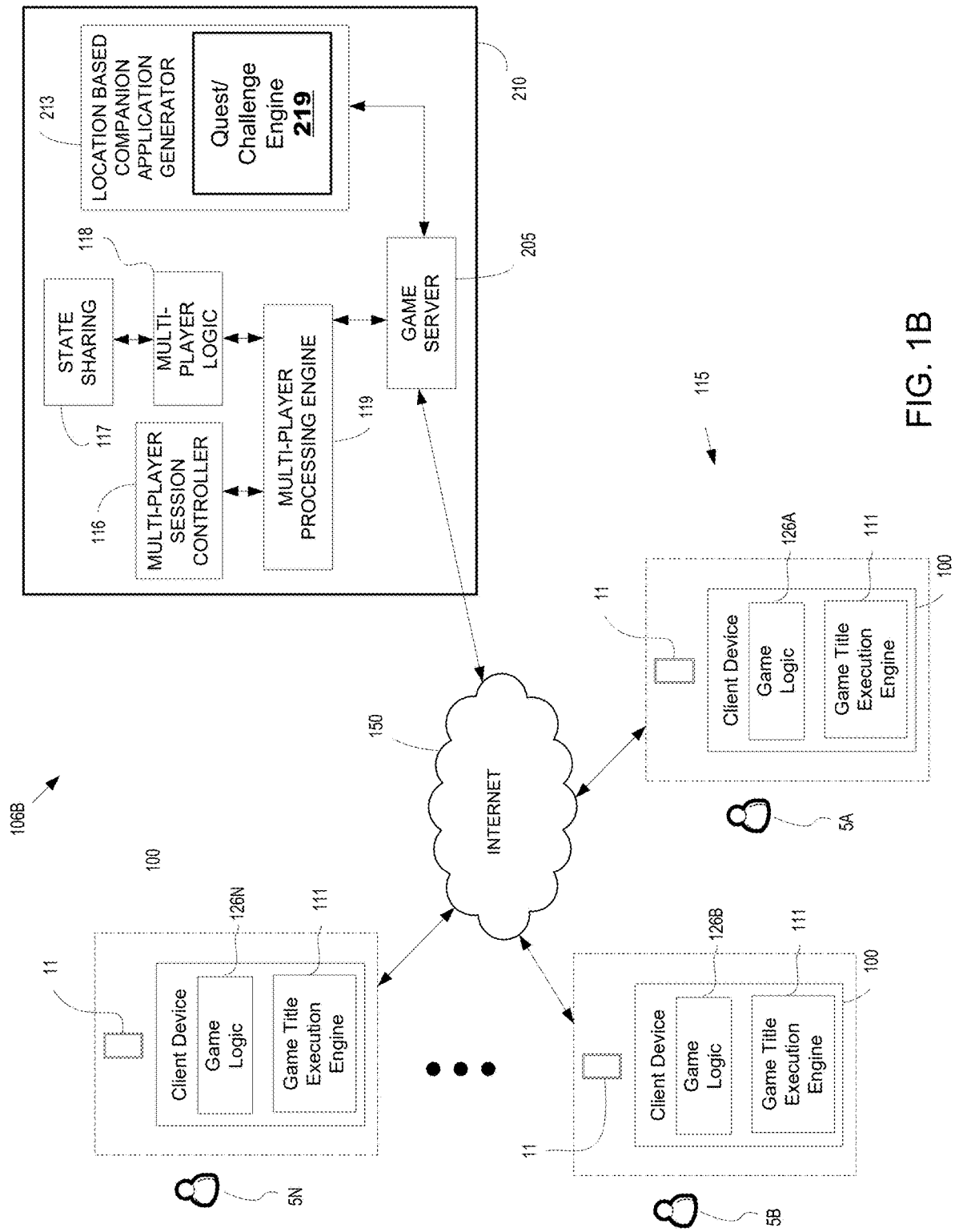
FIG. 1B illustrates a system providing gaming control to one or more users playing one or more gaming applications that are executing locally to the corresponding user, and wherein back-end server support may implement a location based companion interface supporting game play of a corresponding user, in accordance with one embodiment of the present disclosure.

FIG. 1B illustrates a system 106B providing gaming control to one or more users playing one or more gaming applications that are executing locally to the corresponding user, and wherein back-end server support (e.g., accessible through game server 205) may implement a location based companion interface supporting game play of a corresponding user, in accordance with one embodiment of the present disclosure. In one embodiment, system 106B works in conjunction with system 10 of FIG. 1A and system 200 of FIG. 2 to implement the location based companion interface supporting game play of a corresponding user. Referring now to the drawings, like referenced numerals designate identical or corresponding parts.

As shown in FIG. 1B, a plurality of users 115 (e.g., user 5A, user 5B . . . user 5N) is playing a plurality of gaming applications, wherein each of the gaming applications is executed locally on a corresponding client device 100 (e.g., game console) of a corresponding user. In addition, each of the plurality of users 115 has access to a device 11, previously introduced, configured to receive and/or generate a companion interface for display on device 11 the provides contextually relevant information for a corresponding user playing a corresponding gaming application, as previously described. The companion interface may be used for generating a quest/challenge, and may also be used for playing a quest/challenge or supporting the interaction with a quest/challenge, such as through quest/challenge engine 219. Each of the client devices 100 may be configured similarly in that local execution of a corresponding gaming application is performed. For example, user 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, user 5B is playing a second gaming application on a corresponding client device 100, wherein an instance of the second gaming application is executed by a corresponding game title execution engine 111. The second gaming application may be identical to the first gaming application executing for user 5A or a different gaming application. Game logic 126B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

As previously described, client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding user is configured for generating rendered images executed by the game title execution engine 111 executing locally or remotely, and for displaying the rendered images on a display. For example, the rendered images may be associated with an instance of the first gaming application executing on client device 100 of user 5A. For example, a corresponding client device 100 is configured to interact with an instance of a corresponding gaming application as executed locally or remotely to implement a game play of a corresponding user, such as through input commands that are used to drive game play.

In one embodiment, client device 100 is operating in a single-player mode for a corresponding user that is playing a gaming application. Back-end server support via the game server 205 may provide location based companion interface services supporting game play of a corresponding user, as will be described below, in accordance with one embodiment of the present disclosure.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multiplayer processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1C and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. As previously introduced, generator 213 is configured to create contextually relevant information (e.g., assistance information, messages, etc.) to be delivered to or received from user 5. The information is generated based on the game play of user 5 for a particular application (e.g., based on information provided in snapshots). In that manner, generator 213 is able to determine the context of the game play of user 5 and provide contextually relevant information that is deliverable to a comp interface displayable on device 11 (e.g., separate from the device displaying game play of user 5). In addition, quest/challenge engine 219 is configured to allow user 5 playing a gaming application to create the interactive content (e.g., quests/challenges) that are based on the game play of the user but not contained within the gaming application. In particular, a quest/challenge may be defined by asset and achievement parameters based on information contained within snapshots captured during the game play of the user. In addition, engine 219 facilitates interaction with these quests/challenges. For example, the companion interface may display an invitation (e.g., message, marker within a radar mapping, etc.) to play a quest/challenge. The quest/challenge may be played within the companion interface directly, in one embodiment. In another embodiment, the quest/challenge is played outside of the companion interface (e.g., through a jump game play), but the companion interface is configured to support the quest/challenge (e.g., show progress through the quest/challenge).

Figure 1C:
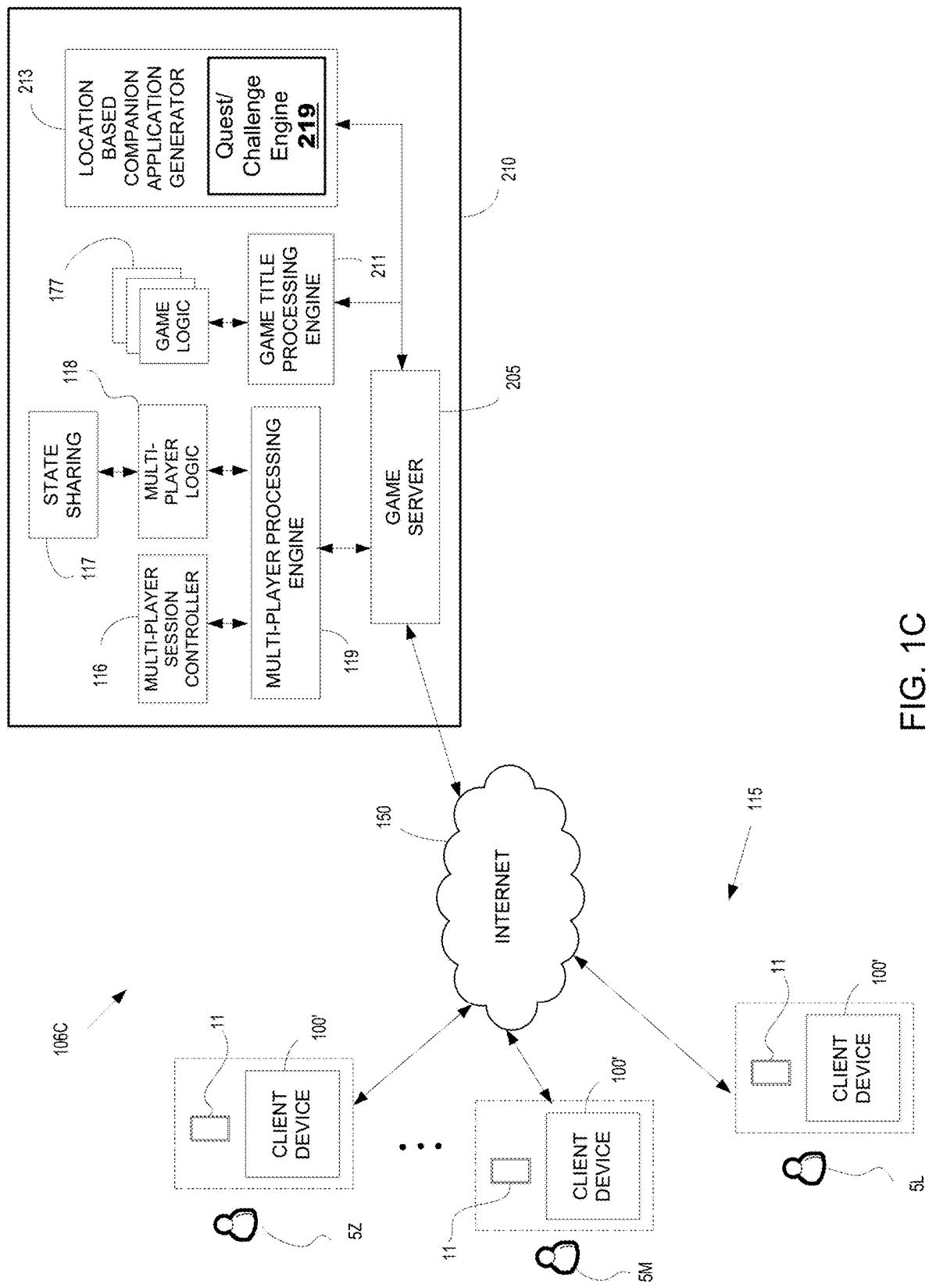
FIG. 1C illustrates a system providing gaming control to one or more users playing a gaming application as executed over a cloud game network, and wherein back-end server support may implement a location based companion interface supporting game play of a corresponding user, in accordance with one embodiment of the present disclosure.

FIG. 1C illustrates a system 106C providing gaming control to a plurality of users 115 (e.g., users 5L, 5M . . . 5Z) playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 106C works in conjunction with system 10 of FIG. 1A and/or system 200 of FIG. 2 to implement the location based companion interface supporting game play of a corresponding user. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of users 115 accesses the game cloud system 210 via network 150, wherein users (e.g., users 5L, 5M . . . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of users 115 has access to a device 11, previously introduced, configured to receive and/or generate a companion interface for display on device 11 that provides contextually relevant information for a corresponding user playing a corresponding gaming application, as previously described. In particular, a client device 100' of a corresponding user 5L is configured for requesting access to gaming applications over a network 150, such as the internet, and for rendering instances of gaming application (e.g., video game) executed by the game server 205 and delivered to a display device associated with the corresponding user 5L. For example, user 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding user is configured for generating rendered images executed by the game title execution engine 211 executing locally or remotely, and for displaying the rendered images on a display. For example, the rendered images may be associated with an instance of the first gaming application executing on client device 100' of user 5L. For example, a corresponding client device 100' is configured to interact with an instance of a corresponding gaming application as executed locally or remotely to implement a game play of a corresponding user, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. As previously introduced, generator 213 is configured to create contextually relevant information (e.g., assistance information, messages, etc.) to be delivered to or received from a corresponding user (e.g., user 5L). The information is generated based on the game play of the user for a particular application (e.g., based on information provided in snapshots). In that manner, generator 213 is able to determine the context of the game play of the corresponding user and provide contextually relevant information that is deliverable to a comp interface displayable on device 11 (e.g., separate from the device displaying game play of user 5L). In addition, as previously introduced, the companion application generator 213 includes a quest/challenge engine 219 that allows user 5 playing a gaming application to create quests/challenges that are based on the game play of the user but not contained within the gaming application. In addition, engine 219 facilitates interaction with these quests/challenges.

Figure 2:
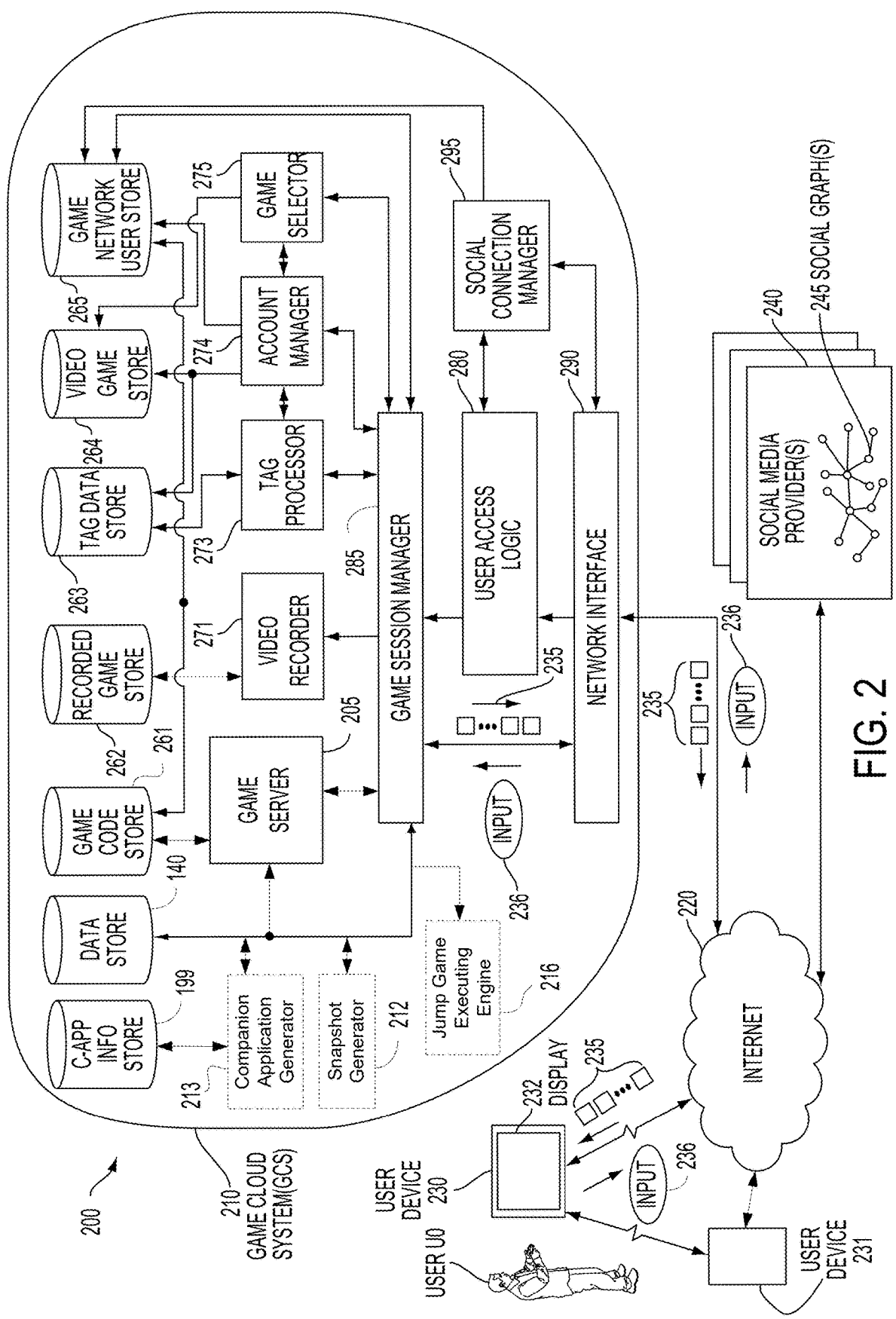
FIG. 2 illustrates a system diagram for enabling access and playing of gaming applications in a game cloud system (GCS), and implementation of a location based companion interface supporting game play of a corresponding user, in accordance with one embodiment of the present disclosure.

FIG. 2 illustrates a system diagram 200 for enabling access and playing of gaming applications stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to save snapshots generated during game plays of a gaming application of multiple users, wherein a snapshot can be used to initiate an instance of the gaming application for a requesting user beginning at a point in the gaming application corresponding to the snapshot. For example, snapshot generator 212 is configured for generating and/or capturing snapshots of game plays of one or more users playing the gaming application. The snapshot generator 212 may be executing external or internal to game server 205. In addition, GCS 210 through the use of snapshots enables a user to navigate through a gaming application, and preview past and future scenes of a gaming application. Further, the snapshots enable a requesting user to jump to a selected point in the video game through a corresponding snapshot to experience the game play of another user. In particular, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 5 of FIG. 1. For example, account manager 274 enables authentication and access by user $U_0$ to GCS 210. Account manager 274 stores information about member users. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, gaming applications stored in data store 264 are made available to any member user who owns those gaming applications.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer. Additional devices 231 (e.g., device 11 of FIG. 1A) may be available to user $U_0$ for purposes of implementing a location based companion interface.

In one embodiment, user device 130 is configured to communicate with GCS 210 to enable user $U_0$ to play a gaming application. In some embodiments, the GCS 210 may include a plurality of virtual machines (VMs) running on a hypervisor of a host machine, with one or more virtual machines configured to execute a game processor module utilizing the hardware resources available to the hypervisor of the host. For example, user $U_0$ may select (e.g., by game title, etc.) a gaming application that is available in the video game data store 264 via the game selection engine 275. The gaming application may be played within a single player gaming environment or in a multi-player gaming environment. In that manner, the selected gaming application is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230. In other embodiments, the GCS 210 is configured to support a plurality of local computing devices supporting a plurality of users, wherein each local computing device may be executing an instance of a gaming application, such as in a single-player gaming application or multi-player gaming application. For example, in a multi-player gaming environment, while the gaming application is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player gaming application. In that manner, the cloud game network coordinates and combines the game plays for each of the users within the multi-player gaming environment.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 201 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 201, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 201 of game server 205 to deliver and obtain user input commands 236 that are used to influence the outcome of a corresponding game play of a gaming application. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a gaming application may be used to enable multiple features that may be available to the user.

Because game plays are executed on GCS 210 by multiple users, information generated and stored from those game plays enable any requesting user to experience the game play of other users, particularly when game plays are executed over GCS 210. In particular, snapshot generator 212 of GCS 210 is configured to save snapshots generated by the game play of users playing gaming applications through GCS 210. In the case of user $U_0$, user device provides an interface allowing user $U_0$ to engage with the gaming application during the game play. Snapshots of the game play by user $U_0$ is generated and saved on GCS 210. Snapshot generator 212 may be executing external to game server 205 as shown in FIG. 2, or may be executing internal to game server 205 as shown in FIG. 1A.

In addition, the information collected from those game plays may be used to generate contextually relevant information provided to user $U_0$ in a corresponding companion application. For example, as previously introduced, companion application generator 213 is configured for implementing a location based companion interface that is configured to support game play of the user $U_0$, wherein the companion interface includes contextually relevant information (e.g., messaging, assistance information, offers of assistance, etc.) that is generated based a location of a character in the game play of user $U_0$. Companion application generator 213 may be executing external to game server 205 as shown in FIG. 2, or may be executing internal to game server 205 as shown in FIG. 1A. In these implementations, the contextually relevant information may be delivered over a network 220 to the user device 231 for display of the companion application interface, including the contextually relevant information. In another embodiment, the companion application generator 213 may be local to the user (e.g., implemented within user device 231) and configured for both generating and displaying the contextually relevant information. In this implementation, the user device 231 may be directly communicating with user device 230 over a local network (or through an external network 220) to implement the companion application interface, wherein the user device 231 may deliver location based information to the user device 231, and wherein device 230 is configured for generating and displaying the companion application interface including the contextually relevant information.

Further, companion application generator 213 includes a quest/challenge engine 219 that allows user 5 playing a gaming application to create quests/challenges that are based on the game play of the user but not contained within the gaming application. In addition, engine 219 facilitates interaction with these quests/challenges.

Further, user device 230 is configured to provide an interface that enables the jumping to a selected point in the gaming application using a snapshot generated in the game play of user $U_0$ or another user. For example, jump game executing engine 216 is configured for accessing a corresponding snapshot, instantiate an instance of the gaming application based on the snapshot, and execute the gaming application beginning at a point in the gaming application corresponding to the snapshot. In that manner, the snapshot enables the requesting user to jump into the game play of the corresponding user at the point corresponding to the snapshot. For instance, user $U_0$ is able to experience the game play of any other user, or go back and review and/or replay his or her own game play. That is, a requesting user, via a snapshot of a corresponding game play, plays the gaming application using the characters used in and corresponding to that game play. Jump game executing engine 216 may be executing external to game server 205 as shown in FIG. 2, or may be executing internal to game server 205 as shown in FIG. 1A.

FIGS. 3-8 are described within the context of a user playing a gaming application. In general, the gaming application may be any interactive game that responds to user input. In particular, FIGS. 3-8 describe a location based companion interface that is configured to support game play of a user, including the generation of quests/challenges that are based on the game play of a corresponding user (e.g., using snapshot information captured during the game play), and wherein the companion interface may be used for distributing and interacting with one or more quests/challenges.

Figure 3:
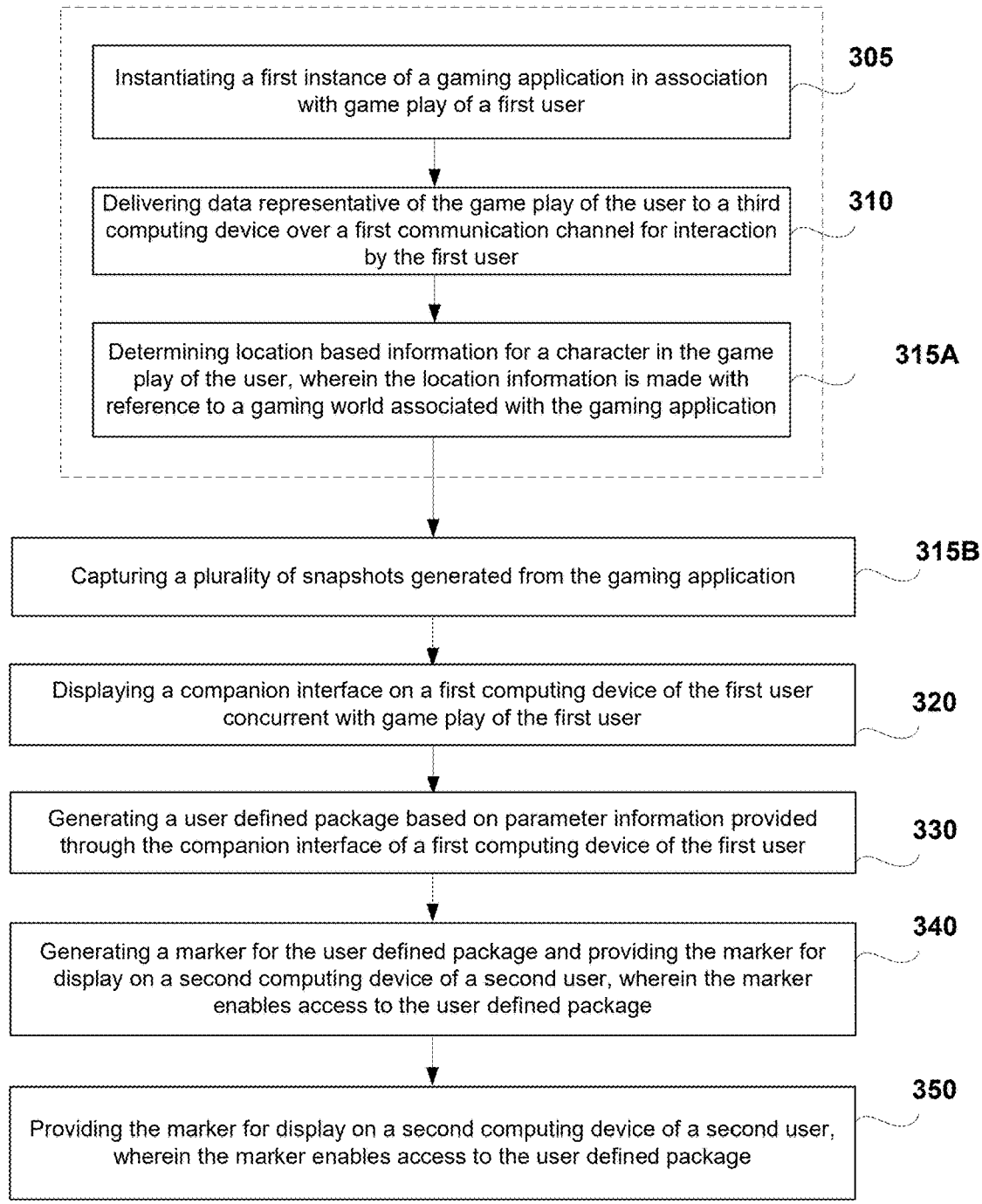
FIG. 3 is a flow diagram illustrating steps in a method for generating quests and/or challenges in association with a gaming application using a location based companion interface supporting game play of a corresponding user that is generating the quests and/or challenges, in accordance with one embodiment of the present disclosure.

With the detailed description of the various modules of the gaming server and client device communicating over a network, a method for implementing a location based companion interface supporting game play of a corresponding user and for generation of and interaction with one or more quests/challenges is now described in relation to flow diagram 300 of FIG. 3, in accordance with one embodiment of the present disclosure. Flow diagram 300 illustrates the process and data flow of operations involved at the game server side for purposes of generating location based information contained within a companion interface that is used for the generation of a quest/challenge based on the game play of a corresponding user. In particular, the method of flow diagram 300 may be performed at least in part by the quest/challenge engine 219 of FIGS. 1A-1C and 2.

Although embodiments of the present invention as disclosed in FIG. 3 are described from the standpoint of the game server side, other embodiments of the present invention are well suited to implementing a location based companion interface within a local user system including a game processor configured for executing a gaming application in support of a game play of a user and configured for generating quests/challenges and/or interaction with the same. For example, the companion interface may be implemented within a local and isolated system, or may be generated by a back-end game server over another network and used for generation of and interaction with quests/challenges.

Flow diagram 300 includes operations 305, 310, and 315 for executing a gaming application and generating location based information of game play of a user playing the gaming application. In particular, at operation 305 the method includes instantiating a first instance of a gaming application in association with game play of a user. As previously described, in one embodiment, the instance of the gaming application can be executed locally at a client device of the user. In other embodiments, the instance of the gaming application may be executing at a back-end game executing engine of a back-end game server, wherein the server may be part of a cloud game network or game cloud system. At operation 310, the method includes delivering data representative of the game play of the user to a computing device (e.g., third computing device) over a first communication channel for interaction by the user (e.g., first user). The communication channel may be implemented for example through a network, such as the internet. As such, rendered images may be delivered for display at the third computing device, wherein the rendered images are generated by the instance of the gaming application in response to input commands made in association with game play of the user.

At operation 315A, the method includes determining location based information for a character in the game play of the user. In particular, the location based information is made with reference to a location of a character in the game play of the user in a gaming world associated with the gaming application. The location based information may be included within snapshots that are generated, captured and/or stored during the game play of the user, as previously described. For example, each snapshot includes metadata and/or information generated with reference to the location of the character. In one embodiment, the metadata and/or information is configured to enable execution of an instance of the gaming application beginning at a point in the gaming application corresponding to the snapshot (e.g., beginning at a jump point corresponding to the state of the game play when the snapshot was captured, which reflects the location of the character in the game play). In one embodiment, a snapshot may be used to instantiate a jump game that is a quest/challenge. For instance, the snapshot includes location based information of the game play, and game state data that defines the state of the game play at the corresponding point (e.g., game state data includes game characters, game objects, object attributes, graphic overlays, assets of a character, skill set of the character, history of task accomplishments within the gaming application for the character, current geographic location of the character in the gaming world, progress through the gaming application in the game play of the user, current status of the game play of the character, etc.), such that the game state data allows for generation of the gaming environment that existed at the corresponding point in the game play. The snapshot may include user saved data used to personalize the gaming application for the user, wherein the data may include information to personalize the character (e.g., shape, look, clothing, weaponry, game difficulty, game level, character attributes, etc.) in the game play. The snapshot may also include random seed data that is relevant to the game state, as previously described.

The remaining operations of flow diagram 300 may be performed by a companion application generator and/or quest/challenge engine 219, which may be executing locally or a back-end server of a cloud game network, as previously described. In particular, at operation 315B the method includes capturing a plurality of snapshots generated from the gaming application during the game play of the user. The information contained within the snapshots may be used for the generation of quests challenges that are based on the game play, and not contained within the gaming application. As such, additional content related to the gaming application, and in some cases relying on execution of the gaming application, may be newly generated. This increases the amount of content and the scope of content related to a gaming application for interaction by one or more users.

At 320, the method includes generating a companion interface providing features in support of the game play of the first user (e.g., including contextually relevant information), and enables the user, or any other viewer, to access information in real time that is generally helpful to user while playing the gaming application. As previously introduced, the companion interface can be used to generate quests and/or challenges based on the game play of the user. For purposes of illustration, the companion interface is displayed on a first computing device of the user generating the quest/challenge. Further, the companion interface is displayed on the first computing device concurrent with the game play of the user. For example, in one embodiment there may be two communication channels delivering information, such as a first communication channel established to deliver data associated with the companion interface (e.g., providing for delivery of interface, and input commands controlling the interface), and a second communication channel established to deliver data representative of game play of the user (e.g., to the third computing device associated with the user). In another embodiment, the companion interface may be delivered along with the data representative of game play of the user, such as through a split screen including a first screen showing the game play and a second screen showing the companion interface. More particularly, the companion interface is generated in real time, and delivered concurrent with the game play of the user, such that the information provided through the interface supports the game play of the user. In that manner, the game play of the user may be augmented with the information provided by the companion interface.

At 330, the method includes generating a user defined package according to parameter information provided by the first user through the first companion interface of the first user. In particular, the parameter information is based on one or more snapshots captured during the game play of the user. For example, the user defined package creates a quest and/or challenge as defined by the parameter information provided by the user through the companion interface.

For example, the parameter information may include one or more asset or achievement parameters. For illustration, an asset parameter may define an asset within the gaming application, wherein the asset may be an object, skill, points, level, or any other definable item or characteristic. An achievement parameter may define a task to be performed or criteria to satisfy. For example, an achievement parameter may define a point in the gaming environment to be reached, a number of points to achieve before reaching a point, an object to obtain, a time period within which a certain area of the gaming application must be accomplished, etc. The achievement parameter may include a positive condition and/or a negative condition. For example, the positive condition may define the use of specific weapon when battling a boss, or permit the killing of enemy combatants through a level. On the other hand, a negative condition may prohibit the use of that weapon, or require that no enemy combatants be killed when passing through a level.

In one embodiment, the user defined package (e.g., defining a quest/challenge) is generated in real-time as the user is playing the gaming application. In this case, a first portion of the parameter information related to the user defined package may be defined by the user within the companion interface. As such, the first portion of parameter information may be received by the quest/challenge engine that is local to the user or at a back end server, wherein the engine is configured for generation of the quest/challenge. For example, the first portion may include defining a point in the gaming environment to be reached, assets to be obtained, achievements or tasks to be accomplished, etc. In one embodiment, the game play of the user is paused while receiving the first portion of the parameter information. In addition, after receipt of the first portion of the parameter information, the method includes resuming game play of the first user. This process may be repeated for generating and/or receiving additional portions of the parameter information. In that manner, the generation of the user defined package may be implemented without interfering with the game play of the user.

In another embodiment, the user defined package is generated post game play. For example, the user defined package may be generated during a replay of the game play, wherein a companion interface is configurable for displaying snapshot information captured during the game play, for displaying information related to the game play, and for generating the user defined package. The game play of the user may be displayed on the third computing device, previously introduced. That is, the replay is displayed on the third device, and the companion interface is displayed on a separate device of the user (e.g., the first device). As such, the companion interface is displayable concurrent with the replay of the game play of the first user. For purposes of generation of the user defined package, the parameter information related to the user defined package is received from the companion interface as displayed on the first computing device during the replay of the game play. For example, as the game play is replayed, for each point reached in a gaming environment as displayed in the replay, a corresponding portion of parameter information may include defining a point in the gaming environment to be reached, assets to be obtained, achievements or tasks to be accomplished, etc.

In still another embodiment, a user generated package may be auto generated. For example, by capturing snapshots during the game play of the user, a user defined package may be automatically generated through selection of a particular snapshot in a natural sequence of snapshots, since snapshots of the game play may be captured in sequential order. For illustration purposes only, a sequence of snapshots related to the game play of the user may culminate in the defeat of a boss at the end of a level of a corresponding gaming application. As such, during the live game play or replay of the game play, a companion interface may display corresponding information captured during the game play and generally supporting the game play or replay, and/or may display an interface configured for generating the user defined package. Selection of a last snapshot in a sequence of snapshots that occur during the game play is received through the companion interface (e.g., the last snapshot taken after defeat of the level boss). A first snapshot in the sequence is determined. For example, the first snapshot may be a naturally occurring start point when first interacting with the level boss, and may be defined by the developer of the gaming application (e.g., entry to the lair of the boss, beginning of canned video presenting the boss, etc.). Also, the first snapshot may be arbitrarily selected (e.g., spanning a predetermined period of time, such as 5 minutes). As such, information in the first snapshot and the last snapshot are included in the parameter information associated with the user defined package. Further, the necessary parameter information is automatically generated based on the selected sequence of snapshots to define the user defined package (e.g., creating the quest/challenge).

At 340 of FIG. 3, the method includes generating a marker for the user defined package. The marker is provided for display on a second computing device of a second user (e.g., user who possibly may interact with the user defined package—quest/challenge). In particular, the marker (e.g., selection of the marker) enables access to the user defined package. For illustration, by selecting the marker, a quest/challenge created by the user defined package is instantiated for purposes of interaction by the user selecting the marker.

The marker may be distributed through any number of methods. For example, the marker may be an icon placed within a companion interface of another user playing the same gaming application (i.e., from which the user defined package was generated). In another example, the marker may be placed within a message that is delivered to directly or indirectly one or more other users (e.g., in a text message, an email message, a social networking message, a companion interface displayed in support of a user playing another gaming application, etc.). In another example, the marker may be placed within a web page as a link to the user defined package. Other distribution methods that enable distribution of the marker are contemplated and supported, wherein the marker enables access to the user defined package.

Figure 4A:
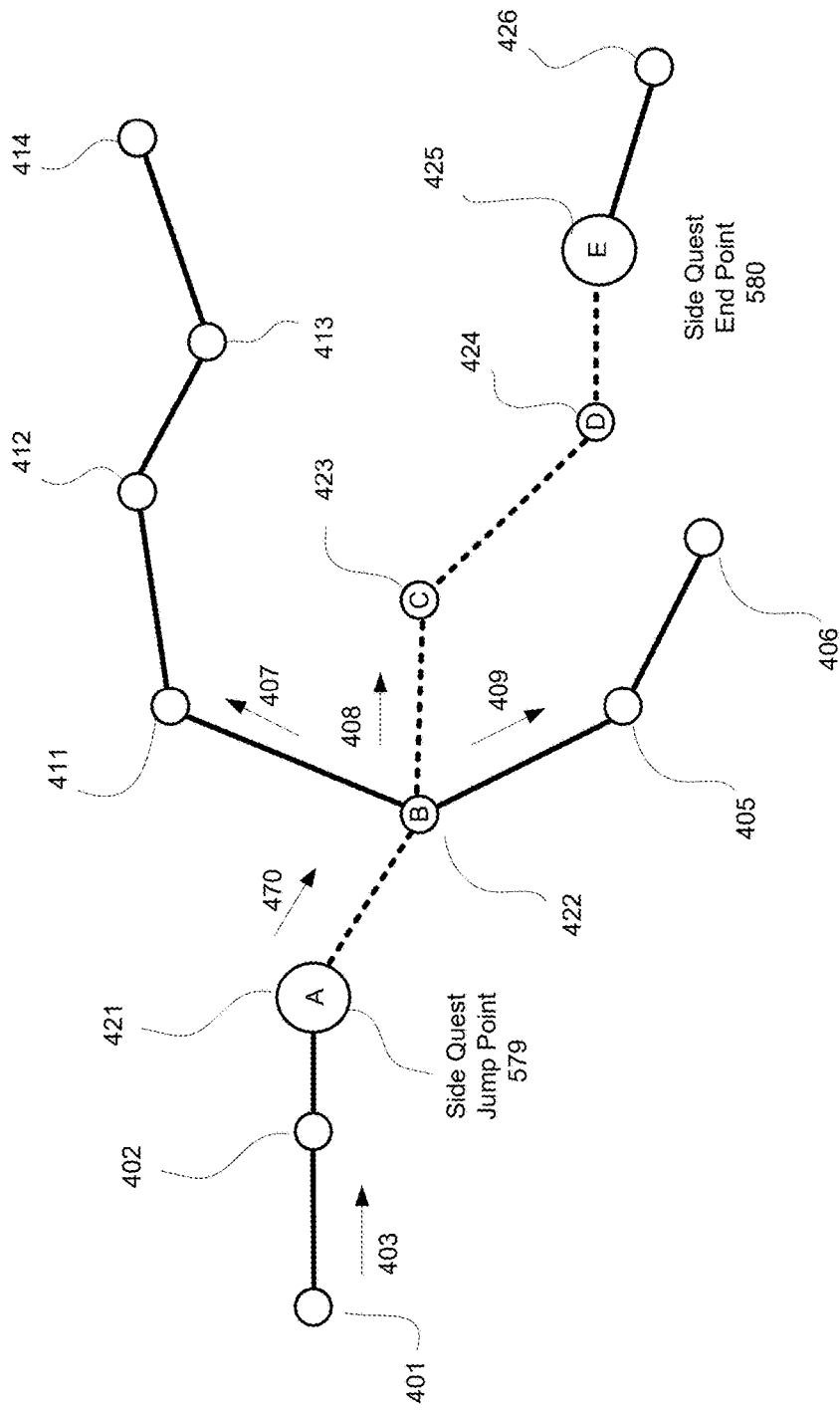
FIG. 4A is an illustration of a node graph showing the hierarchy of nodes (with corresponding snapshots) generated in association with snapshots captured during game play of a gaming application by a first user, wherein nodes of a side quest are shown, wherein the side quest is generated using a location based companion interface supporting game play of a corresponding user, in accordance with one embodiment of the present disclosure.

FIG. 4A is an illustration of a node graph 400A showing the hierarchy of nodes (with corresponding snapshots) generated in association with snapshots captured during game play of a gaming application by a first user, wherein nodes of a side quest are shown, wherein the side quest is generated using a location based companion interface supporting game play of a corresponding user, in accordance with one embodiment of the present disclosure. In particular, the nodes correspond to points in game play of a video game where a snapshot has been captured.

Node graph 400A includes a plurality of snapshot nodes that define the various actual paths that a character has taken during the game play of a corresponding user. For example, path 403 is defined between snapshot nodes 401 and 402. In path 403, the character may proceed from node 402 to node 421 until reaching a branch node 422, from which three node branches define three different paths a character may have taken during the game play, wherein node branch 407 includes nodes 411, 412, 413, and 414; node branch 408 includes nodes 423, 424, 425, and 426; and node branch 409 includes nodes 405 and 406. Other snapshot nodes may be generated during the game play of the user, but are not shown for purposes of clarity and illustration.

Node graph also shows a path defined in a user generated package, such as one creating a quest/challenge, referred to as side quest 470. The side quest 470 includes a jump point A (or start point) corresponding to snapshot node 421, point B corresponding to snapshot node 422, point C corresponding to snapshot node 423, point D corresponding to snapshot node 424, and end point E correspond to snapshot node 425. Each of these points may correspond to a particular point in the gaming application as defined during the game play of the user.

As previously described, each of the snapshots of the snapshot nodes enable a selecting user to jump into the game play of the user. For example, the jump executing engine 216 of game processor 210 is configured to access a selected snapshot (e.g., through a snapshot image, through node selection in node graph 400A, through a timeline of snapshots, etc.), instantiate another instance of the video game based on the snapshot, and execute the gaming application beginning at a point (now identified as a jump point) in the gaming application corresponding to the captured snapshot. For example, the snapshot may enable a jump game of a quest/challenge. In that manner, the selecting user jumps into a character of the game play of the user, and plays an instantiation of the game play of the user using that character. As an illustration, for side quest 470, a user accepting/playing the side quest may be required to go through each of the points A-E in sequential order. In one embodiment, the side quest 470 may be a speed run, wherein a time limit defines a period within which the side quest must be completed. As such, snapshot node 421 enables the instantiation of a jump game play for a participating user beginning at the start point A. In support, a companion interface may provide additional information related to the side quest 470, such as the next point to navigate to, assets to obtain, achievements to satisfy, tasks to perform, etc.

Figure 4B:
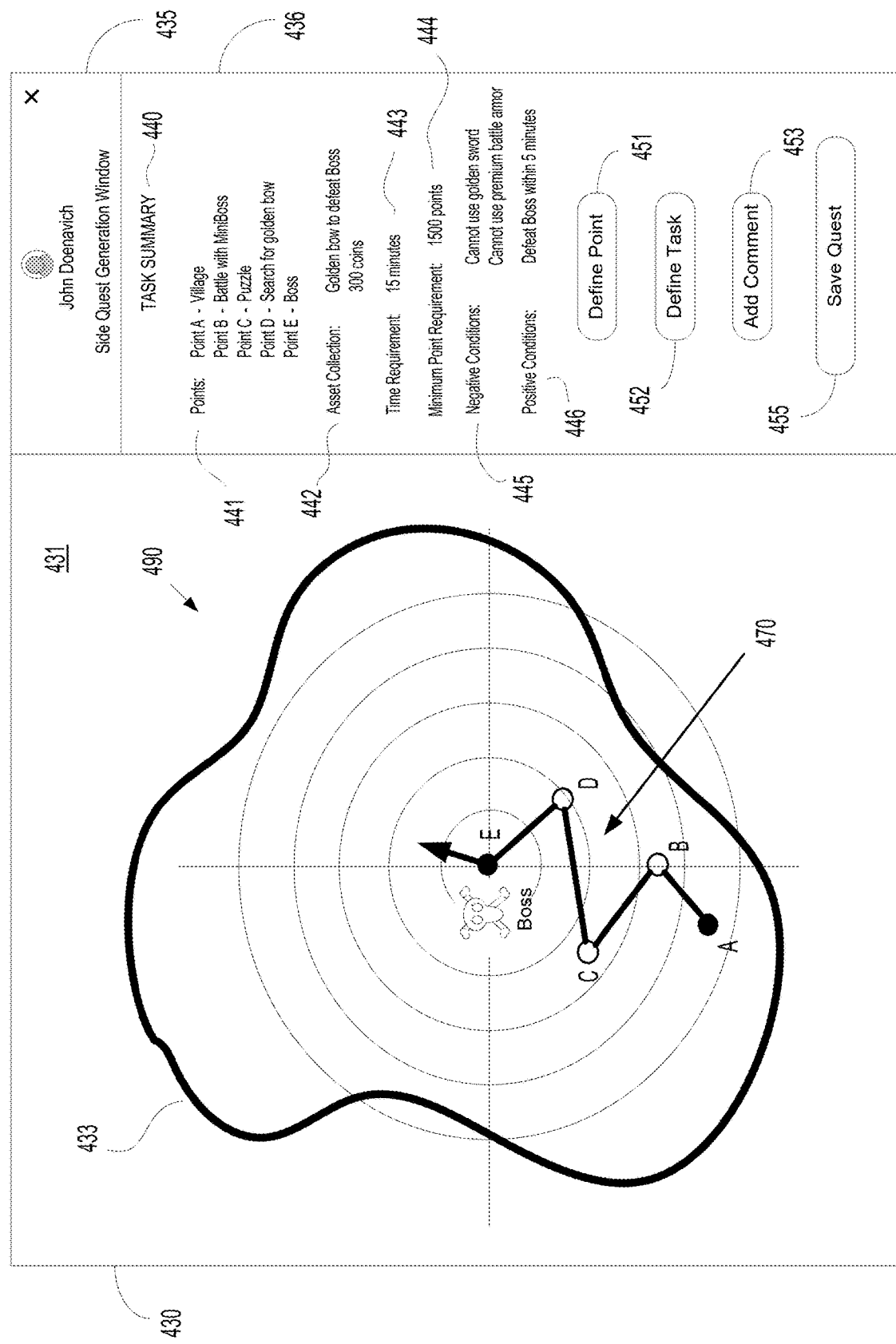
FIG. 4B is an illustration of a companion interface supporting game play of a first user, wherein the companion interface is used to generate a side quest, in accordance with one embodiment of the present disclosure.

FIG. 4B is an illustration of a companion interface 430 supporting game play of a first user, wherein the companion interface is used to generate a side quest, in accordance with one embodiment of the present disclosure. In particular, companion interface 430 is used to generate side quest 470, first introduced in FIG. 4A.

Companion interface 430 includes window 431 including a radar mapping 490 showing a character in a game play of the user who is generating the side quest 470. The character may be located at the center of the radar mapping 490. The game play is within a gaming world or environment 433 of the corresponding gaming application. In particular, radar mapping 490 shows at least a portion of the gaming world of the gaming application and provides directional relationships between objects in the radar mapping (e.g., direction and distance. Further, the radar mapping 490 includes at least objects/features located within the gaming world, and locations of characters of the user and other players.

For example, companion interface 430 illustrates points A-E in side quest 470, as illustrated in radar mapping 490. Side quest 470 is presented differently in node graph 400A, which illustrates progression through a gaming application, than in radar mapping 490, which shows travel and directional relationships between objects in a gaming world 433. Radar mapping 490 shows side quest 470 in in its completed form, including points A-E.

Companion interface 430 may be used to generate side quest 470, and/or may be used for providing information related to side quest 470. For example, window 435 indicates that user, John Doenavich, is generating side quest 470. That is, the game play shows the interaction of John Doenavich with a corresponding gaming application. For purposes of illustration and clarity, the side quest 470 may be referred to as "Level 7 Boss."

For example, companion interface 430 may be used to define parameter information creating the user defined package (e.g., side quest 470), as shown in window 436. Button 451 allows user Doenavich to define point within the gaming world 433 for inclusion in the side quest 470. Button 452 allows the user to define tasks to be performed. These tasks may include satisfying asset and/or achievement parameters, previously introduced. For example, an asset parameter may define an object (e.g., weapon, food, etc.), skill level, strength, etc. that must be obtained by a character within the side quest 470. An achievement parameter may include an asset parameter (e.g., obtaining an asset), and defines what a character must achieve. For example, an achievement parameter may define a task to be performed and completed, such as, but not limited to, obtaining an object, reaching a point in a gaming world, beating a boss, meeting a mentor in the gaming application, reaching a skill level, performing a specific set of steps, traversing a sequence of points, etc. Button 455 allows the user to save the parameter information associated with a user defined package (e.g., creating side quest 470). Other buttons or other methods for defining parameter info may also be used for defining asset and/or achievement parameters by a user, but are not shown.

In addition, button 453 allows the user to add a comment. For example, the comment may be displayable within the context of a user playing the side quest 470. FIG. 5C illustrates how a comment or series of comments 563 from user Doenavich may be displayed within a companion interface 430' of another user playing the side quest 470. These comments 563 may be triggered for display upon the other user reaching a particular point in the side quest 470, such as point C.

Further, companion interface 430 may provide a summary of the side quest 470. For example, section 441 of window 436 defines the points in the side quest 470, to include points A-E. Additional information may be included, such as start point A is at a village, point B is in an of the gaming world 433 that includes a battle with a mini-boss, point C is a puzzle to be completed within the gaming world 433, point D occurs in an area where weapon (Golden Bow) can be obtained, and point E is an area within gaming 433 where the battle with the level boss (e.g., of level 7) occurs.

Section 442 defines the assets to be collected. For example, a golden bow is needed to defeat the boss at the end of the side quest 470, wherein the golden bow can be obtained at point D. In addition, 300 coins need to be collected during execution of the side quest 470. Section 443 may define a threshold time to complete the side quest 470 (e.g., 15 minutes). In addition, section 444 may define the minimum number of points required to complete the side quest 470 (e.g., 1500 points).

As previously described, asset and/or achievement parameters may include positive or negative conditions. Side quest 470 illustrates these types of conditions. For example, section 445 defines negative conditions in association with completion of the side quest 470, including not being able to use the golden sword (note, user can use the newly found golden bow), and not being able to use premium battle armor. Presumably, this may make completing the side quest and satisfying its parameters or conditions even harder. Section 446 defines positive conditions defined in association with completion of the side quest 470, including battling and defeating the boss within 5 minutes of the allotted 15 minutes.

Figure 5A:
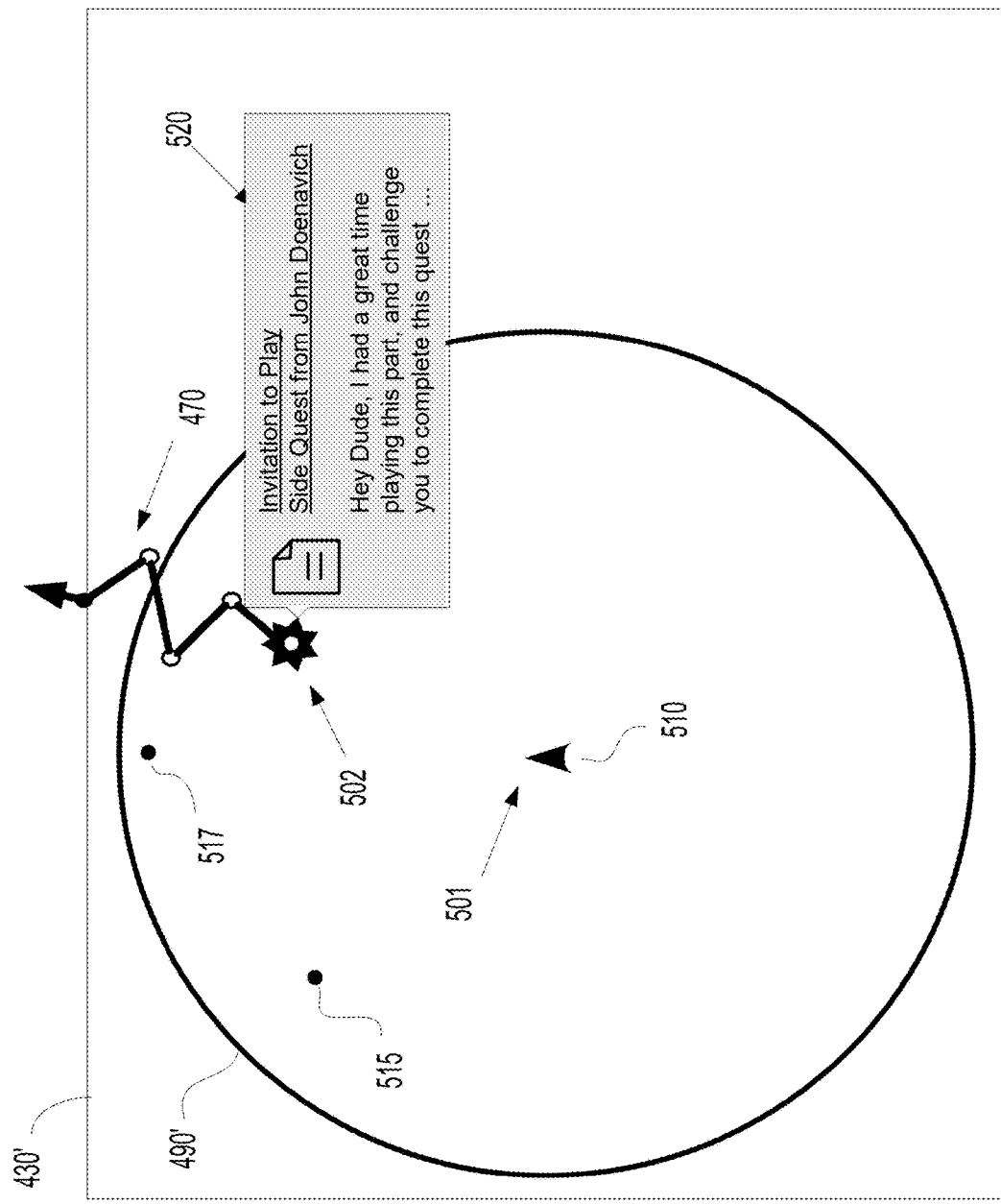
FIG. 5A is an illustration of a companion interface of a second user that is playing the same gaming application associated with a side quest, wherein the companion interface includes an invitation to play the side quest, in accordance with one embodiment of the present disclosure.

FIG. 5A is an illustration of a companion interface 430' of a second user that is playing the same gaming application associated with a side quest (e.g., quest 470), wherein the companion interface includes an invitation to play the side quest, in accordance with one embodiment of the present disclosure. The second user did not generate the side quest 470, but is interacting with or playing the side quest 470.

The side quest 470 may be instantiated using any number of methods. For example, the second user may receive a message, wherein the message includes a marker providing access to the user defined package (e.g., defining the side quest 470). The message may be presented in any form, such as in an email, posted to a site (e.g., social networking site, gaming site, etc.), presented in a companion interface while the second user is plying the gaming application (from which the side quest was generated), presented in a companion interface while the second user is playing another gaming application, etc. In one embodiment, the user may send the invitation to play the side quest to a friend. In that case, a friend of the user may be identified (e.g., the second user). A message (e.g., including the marker providing access to the user defined package associated with side quest 470) may be delivered to the second user friend via a computing device associated with the second user.

In particular, companion interface 430' is displayed concurrent with game play of the second user while playing the gaming application. As shown', companion interface 430' includes a radar mapping 490' presented in association with the game play of the second user. For example, a character represented by arrow point 510 of the second user is located within the gaming world 433 (not shown), and presented at the center 501 of radar mapping 490'. Arrow point 510 may also give an orientation of the character within the gaming world 433. Additional objects 515 and 517 are shown in relation to the location 510 of the character. These objects may be other characters of other users playing the gaming application (e.g., friends), or points of interest, etc.

Message 520 may include commentary from the side quest creator. For example, the creator, John Doenavich, may describe the reason why he created side quest 470, or may include a taunt challenging the second user to compete the side quest 470 given certain constraints or conditions, just as he was under when playing his game play (e.g., finished the portion of the game play associated with side quest 470 within 15 minutes).

In addition, the message 520 may be presented with points A-E of side quest 470, wherein start point A is displayed at location 502. In one embodiment, the message 520 and the points of side quest 470 are triggered for display upon the second user reaching a particular point (e.g., location 501) in the gaming world 433 of the gaming application. If the second user chooses to accept the side quest 470, radar mapping 490' provides the general direction towards location 502 indicating the start of the side quest 470. In this embodiment, the side quest 470 is played within the game play of the second user. In another embodiment, the side quest 470 is played within a jump game play of the creating user, Doenavich, as previously described. This jump game play may be accessed through message 520.

Figure 5B:
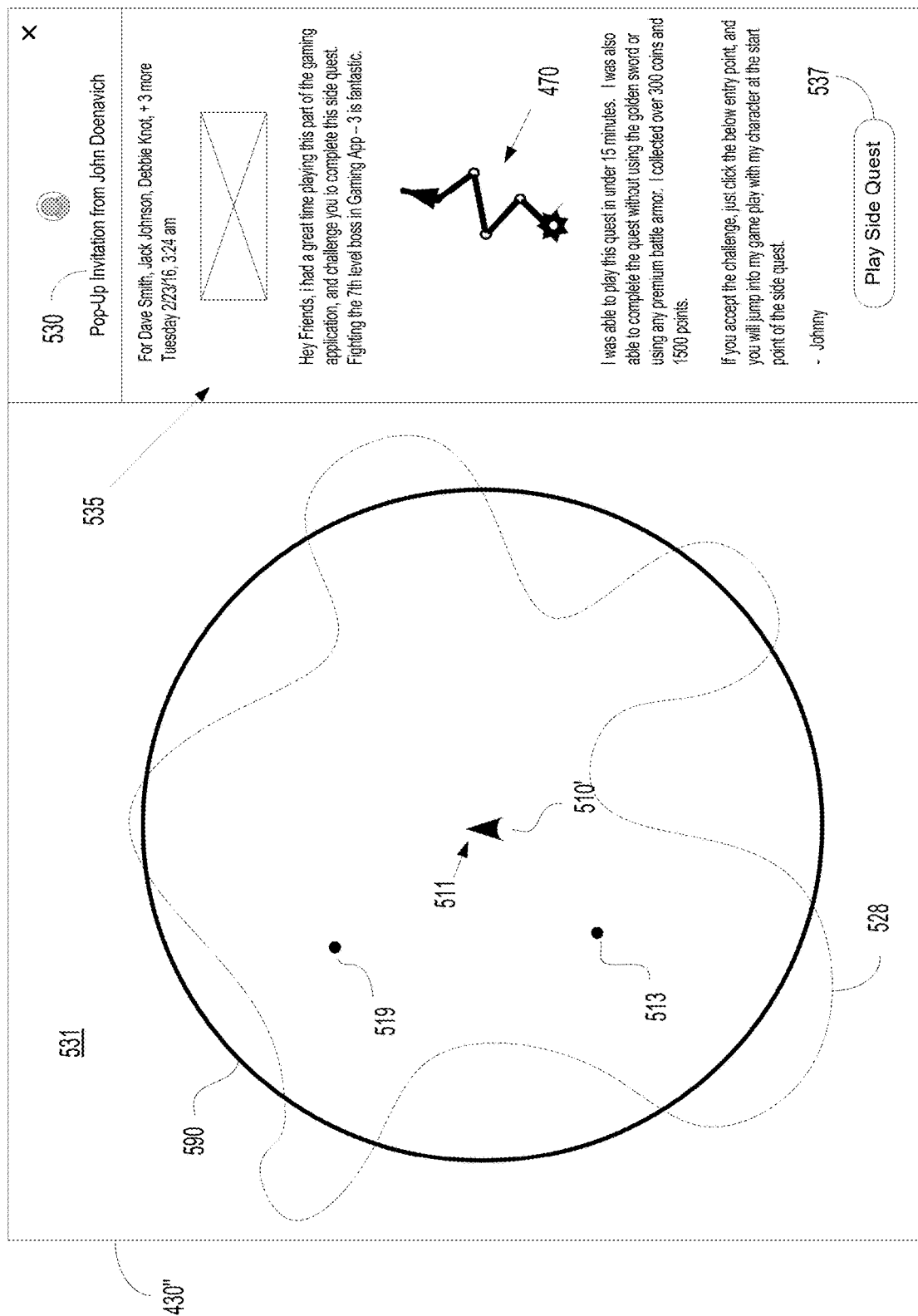
FIG. 5B is an illustration of a companion interface of a second user that may or may not be playing the same gaming application associated with a side quest, wherein the companion interface includes a message including an invitation to play the side quest, in accordance with one embodiment of the present disclosure.
Figure 5C:
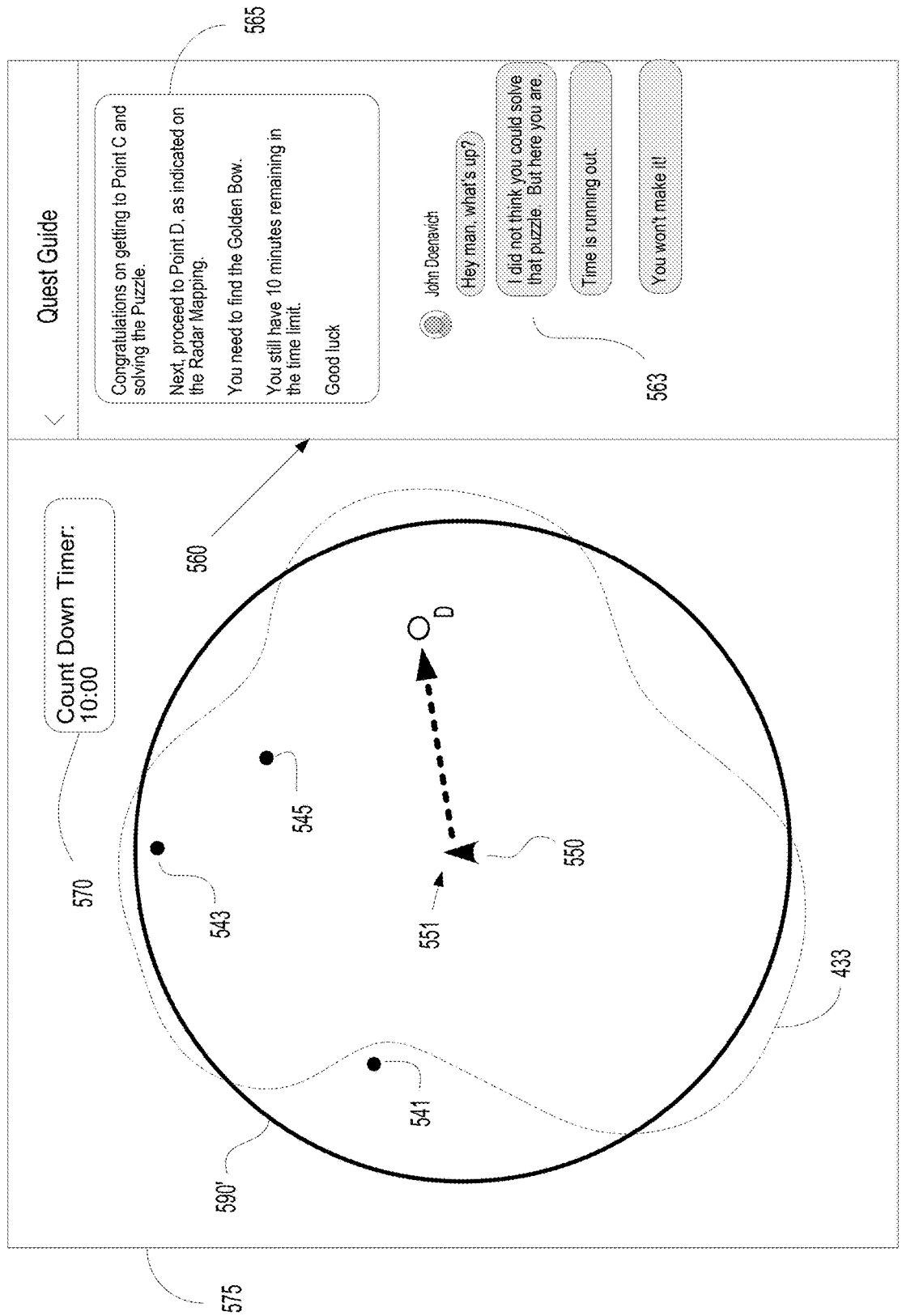
FIG. 5C illustrates companion interface of a second user that is playing a side quest, in accordance with one embodiment of the present disclosure.

FIG. 5B is an illustration of a companion interface 430" of a second user that may or may not be playing the same gaming application associated with a side quest (e.g., quest 470), wherein the companion interface includes a message 535 including an invitation to play the side quest, in accordance with one embodiment of the present disclosure. In this particular case, the second user is playing another gaming application, having a gaming world 528, wherein the game play is presented on a computing device (e.g., fourth computing device) associated the second user.

In particular, companion interface 430" is displayed concurrent with game play of the second user, and is displayed on another computing device (e.g., second computing device) associated with the second user, and is presented in support of the game play of the second user. As shown, companion interface 430" includes a radar mapping 590. For example, a character represented by arrow point 510' of the second user is located within the gaming world 528, and presented at the center 511 of radar mapping 590. Additional objects 513 and 519 are shown in relation to the location 511 of the character. These objects may be other characters of other users playing the gaming application (e.g., friends), or points of interest, etc., as previously described.

As shown in FIG. 5B, the message is in the form of a pop-up invitation 530, delivered from John Doenavich, the creator of side quest 470, though the pop-up feature is not necessary. Invitation 530 is presented within one or more contexts, each of which is outside of any play of the gaming application used to create the side quest 470. In other embodiments, the message is requested by the second user, and populated in companion interface 430". In particular, window 535 shows details of the message. In this particular scenario, the creator delivers the message to a set of friends. That is, the invitation to play the side quest 470 may be targeted to one or more friends of the user creator, Doenavich. These friends may be discoverable by the game server 205 of FIG. 2 (e.g., through API access of social networks), and presented to the user creator via a corresponding companion interface used to create the side quest 470. After selection, the message may be delivered to respective computing devices (via companion interfaces, or other computing device displays, etc.) associated with the targeted users. As shown, the message 535 is targeted to 6 users, including Dave Smith, Jack Johnson, and Debbie Knot, etc.

The message 535 includes points of the side quest 470 (e.g., points A-E), and a general description of the side quest (e.g., reaching and beating the $7^{th}$ level boss in a gaming application). Creator Doenavich describes how much fun he had playing the gaming application, as represented in the side quest, and presents a challenge to play the side quest within a given amount of time, while amassing a certain number of points, and coins. The invitation includes a button 537 that launches the side quest 470. For example, the side quest 470 may be launched in a jump game based off the game play of creator Doenavich.

FIG. 5C illustrates companion interface 575 of a second user that is playing a side quest (e.g., quest 470), in accordance with one embodiment of the present disclosure. For example, the second user may select the marker (e.g., presented within a companion interface, or other display) that provides access to the user defined package associated with the side quest 470. Selection of the marker initiates the side quest 470 on a corresponding computing device of the second user (e.g., the fourth computing device in a jump game). For example, a quest game play may be initiated based on a snapshot contained within the user defined package. The snapshot enables execution of the gaming application associated with the side quest 470 for the quest game play based on the game play of the creator user (e.g., Doenavich) beginning from a point (e.g., point A) in the gaming application corresponding to the selected snapshot.

The companion interface 575 is generated and displayed concurrent with the quest game play of the second user. For example, the companion interface 575 is displayed on another computing device (e.g., second computing device) associated with the second user, and is presented in support of the quest game play. As shown, companion interface 575 includes a radar mapping 590'. For example, a character represented by arrow point 550 of the second user is located within the gaming world 433 (previously presented in companion interface 430 of creator Doenavich), and presented at the center of radar mapping 590. Additional objects 541 and 543 are shown in relation to the location 551 of the character. These objects may be other characters of other users playing the gaming application (e.g., friends), or points of interest, etc., as previously described.

During the quest game play, a second plurality of snapshots generated from the quest game play is captured. In that manner, progress through the quest game play can be implemented, based on the captured snapshots. The companion interface 575 is configured to provide information related to the quest progress, as well as supporting the quest game play. For example, an instruction 565 for the side quest 470 may be provided within window 560 of companion interface 575.

The instruction may be part of a step-by-step instruction package presented to the second user at various points in the quest game play, such that instructions may be associated with locations and/or actions in the quest game play of the second user, such that a first instruction may be associated with a combination of a first location/first action, a second instruction may be associated with a combination of a second location/second action, etc., for example, a first instruction for the quest 470 is presented in association with a first location in the radar mapping 590' and gaming world 433, wherein the first instruction includes travel to a second location within the gaming world. As an illustration, the first instruction may include assets required by a character to collect, and instructions for obtaining those assets. Tracking is enabled to determine completion of the first instruction. Thereafter, a second instruction for the side quest 470 is provided in association with a second location in the radar mapping when game play of the second user reaches the second location. Also, the second instruction may be presented right away after completion of the first instruction, such as in association with the first location.

In particular, instruction 565 may correspond to a location in the side quest 470, as represented in the radar mapping 590'. For example, the location may correspond to point C of side quest 470 (e.g., the puzzle). As shown in FIG. 5C, the second user has completed the puzzle at point C, and further instructions are provided, such as now proceeding to point D in the direction provided in the radar mapping 590' and finding the golden bow. Additional information may be provided, such as how much time is remaining.

Further, window 560 may include commentary from creator Doenavich that is presented to the second user after some trigger event (e.g., completing the puzzle at point C). For example, the commentary may include a taunt from the friend (e.g., "I did not think you could solve that puzzle . . . Time is running out . . . You won't make it."). As another example, the message may include encouraging words from the friend (e.g., "Congratulations, you finally made it! It took me forever to get here. Get through the next section quick, and see you on the flip side.").

Figure 6A:
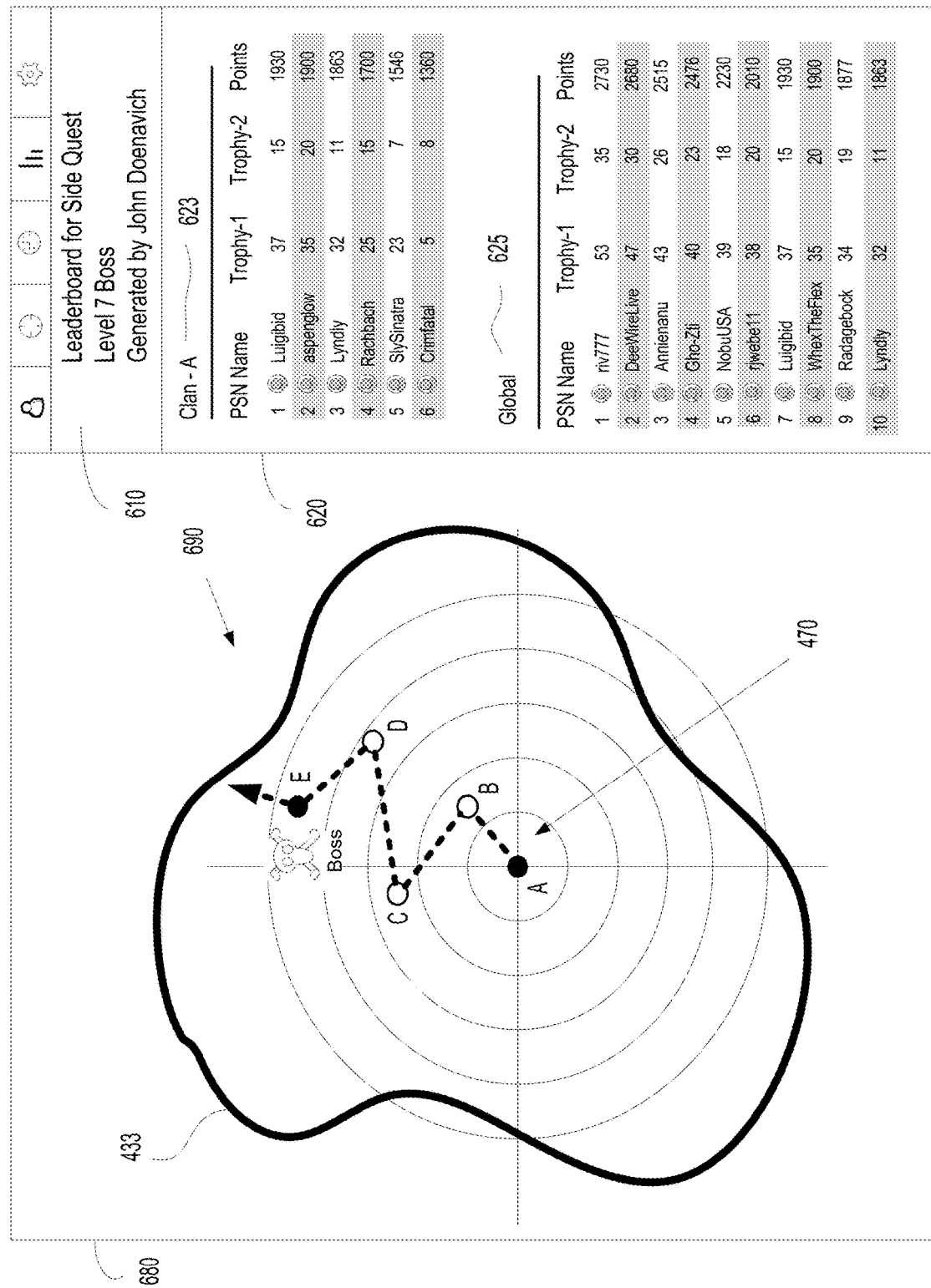
FIG. 6A illustrates a leaderboard for a side quest as displayed within a companion interface of a second user playing the side quest of a gaming application, in accordance with one embodiment of the present disclosure.

FIG. 6A illustrates a leaderboard for a side quest (e.g., quest 470 generated by creator Doenavich) as displayed within a companion interface 680 of a second user playing the side quest of a gaming application, in accordance with one embodiment of the present disclosure. Window 610 provides identifying information for the side quest 470, including the title—Level 7 Boss; and the name of the creator of the side quest 470—Doenavich. Window 610 indicates that leaderboard information is also presented below in window 620.

In one use case, after the second user accepts interaction with the side quest 470 (e.g., playing the quest), companion interface 680 is generated and presented in support of the quest game play. A radar mapping 690 is presented within the companion interface 680 in association with gaming world 433 of the gaming application. Points A-E of the side quest 470 are presented, with dotted lines showing the paths to be taken by the second user during interaction with the side quest 470. End point E is also shown with a boss symbol, indicating that a battle with the boss at point E is anticipated.

Before the side quest 470 is started, a leaderboard may be presented to the user, wherein the leaderboard shows information related to other users playing with the side quest 470. In one embodiment, the information shows high scores. For example, window 620 shows high scores from a clan—A (e.g., under the Clan—A heading), which may be a group of friends (e.g., Doenavich, Dave Smith, Jack Johnson, Debbie Knot, etc.). High scores of users playing the side quest 470 within the clan—A are shown. The users listed are identified by their handle (e.g., PlayStation Network name—PSN). Various pieces of information may be included, such as number of trophies won in a certain category, number of points, etc. In addition, high scores from all the users (e.g., under the Global heading) playing the side quest 470 is also shown. Similar information is presented (e.g., trophy information, score information, etc.).

Figure 6B:
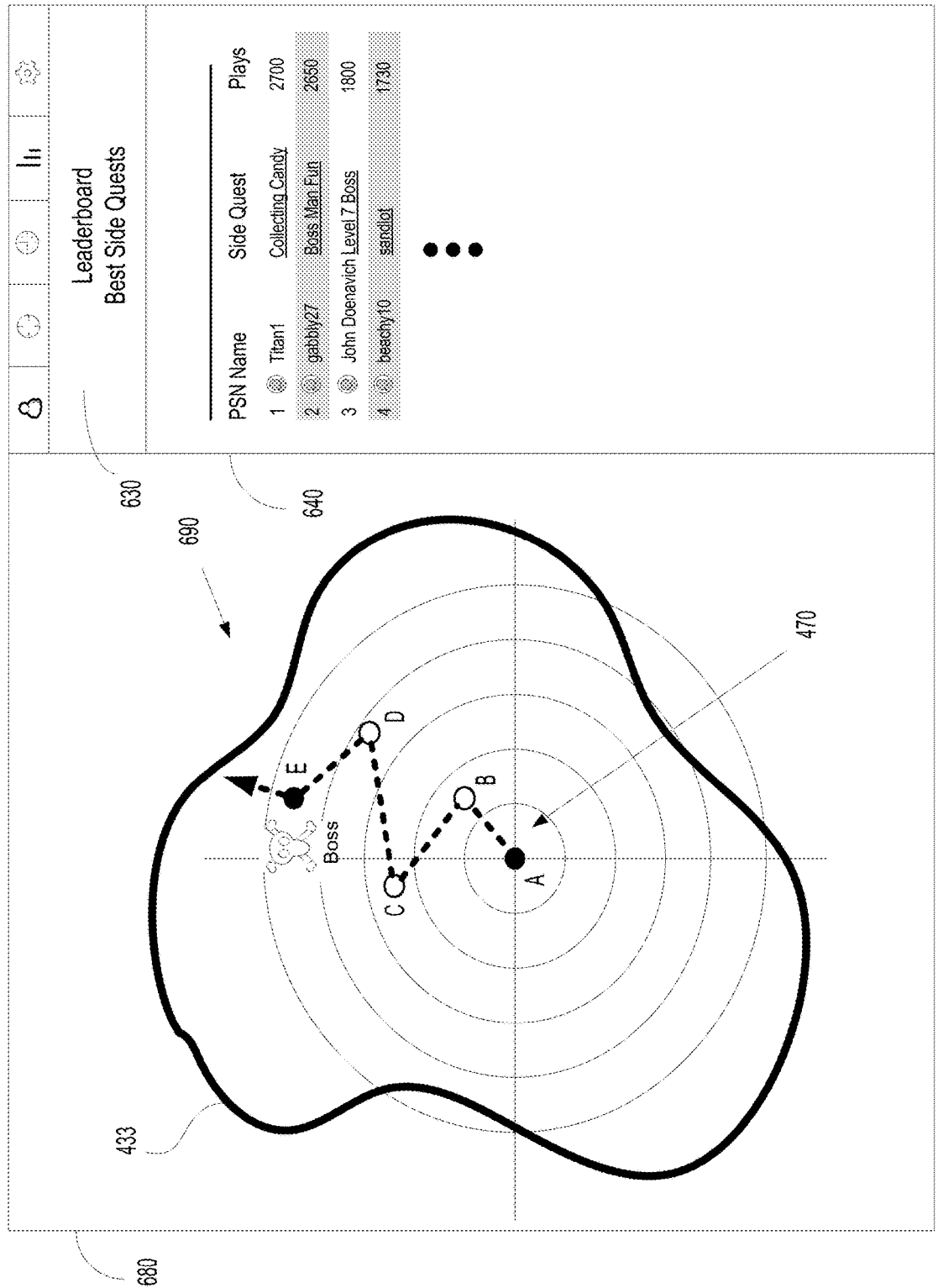
FIG. 6B illustrates a leaderboard showing the most popular side quests as created by quest developers, wherein the leaderboard is displayed within a companion interface of a second user, in accordance with one embodiment of the present disclosure.

FIG. 6B illustrates a leaderboard showing the most popular side quests as created by quest developers, wherein the leaderboard is displayed within a companion interface 680 of a second user, previously introduced in FIG. 6A, in accordance with one embodiment of the present disclosure. In one use case, after the second user accepts interaction with the side quest 470 (e.g., playing the quest), companion interface 680 is generated and presented in support of the quest game play. A radar mapping 690 is presented within the companion interface 680 in association with gaming world 433 of the gaming application, similar to the one shown in FIG. 6A. Points A-E of the side quest 470 are presented, with dotted lines showing the paths to be taken by the second user during interaction with the side quest 470, ending with a boss battle.

Instead of providing leaderboard information related to the gaming application used to generate side quest 470, leaderboard information may be presented for all types of side quests (e.g., quests/challenges). Window 630 provides labeling indicating the leaderboard is for the best side quests.

As such, before the side quest 470 is started, the leaderboard of FIG. 6B may be presented to the user in window 640, wherein the leaderboard shows information related to the most popular side quests. For example, the most popular side quests may be determined by the number of plays by users playing those side quests. In addition, the creator of the side quest is presented. For example, the side quest titled "Collecting Candy" is created by user Titan1, and is atop the leaderboard for having the most plays—2700. Other side quests are listed, including "Boss Man Fun, "Level 7 Boss," "sandlot," etc. As shown, side quest 470 ranks in the top 3 of the most popular side quests—having 1800 plays.

If the second user wishes to not play side quest 470, the companion interface provides access to other side quests. For example, each of the side quests in the leaderboard may include a link that provides access to the corresponding user defined package (e.g., link to "Collecting Candy"), or any other connecting methods for initiating a side quest.

While specific embodiments have been provided to demonstrate the generation and implementation of a location based companion interface that is configured to support game play of a user, as well as the generation of a quest and/or challenge created external to the development of a corresponding gaming application. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 7:
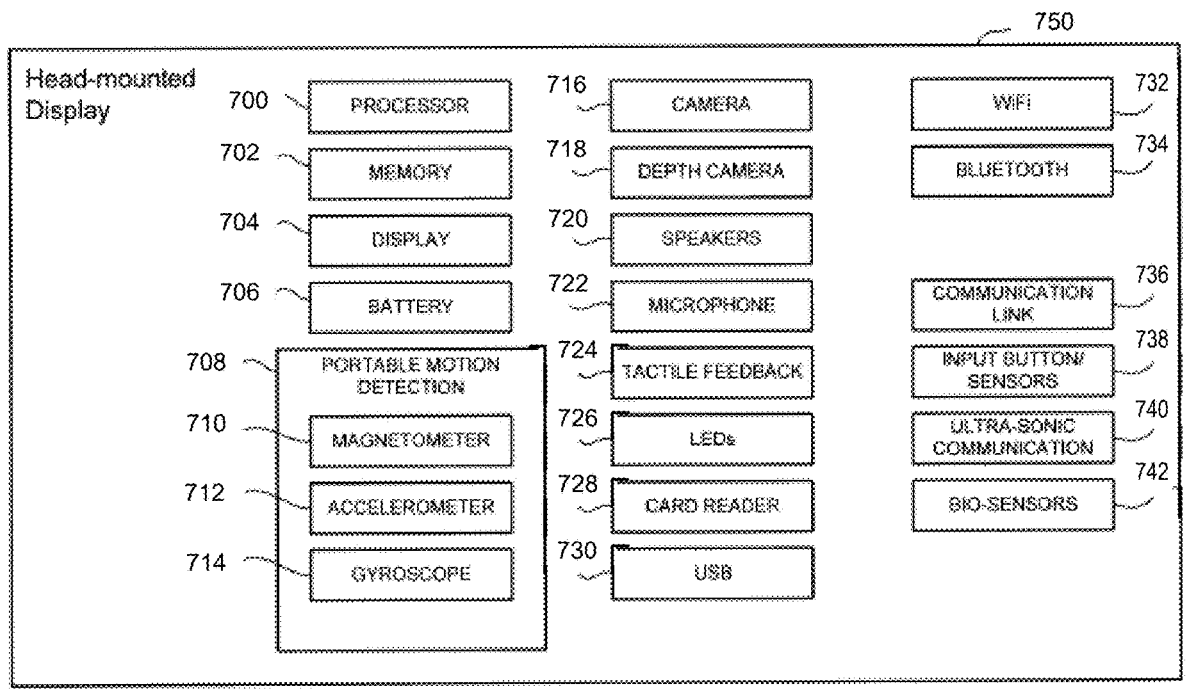
FIG. 7 is a diagram illustrating components of a head-mounted display is shown, in accordance with an embodiment of the disclosure.

FIG. 7, a diagram illustrating components of a head-mounted display 750 is shown, in accordance with an embodiment of the disclosure. The head-mounted display 750 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 750. A motion detection module 708 may include any of various kinds of motion sensitive hardware, such as a magnetometer 710, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710 to obtain the inclination and azimuth of the head-mounted display 750.

A gyroscope is a device for measuring or maintaining orientation, based on the principles of angular momentum.

In one embodiment, three gyroscopes 714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 750, including a camera that is rear-facing (directed away from a user when the user is viewing the display of the head-mounted display 750), and a camera that is front-facing (directed towards the user when the user is viewing the display of the head-mounted display 750). Additionally, a depth camera 718 may be included in the head-mounted display 750 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 750 includes speakers 720 for providing audio output. Also, a microphone 722 may be included for capturing audio from the real environment, including sounds from the ambient environment, speech made by the user, etc. The head-mounted display 750 includes tactile feedback module 724 for providing tactile feedback to the user. In one embodiment, the tactile feedback module 724 is capable of causing movement and/or vibration of the head-mounted display 750 so as to provide tactile feedback to the user.

LEDs 726 are provided as visual indicators of statuses of the head-mounted display 750. For example, an LED may indicate battery level, power on, etc. A card reader 728 is provided to enable the head-mounted display 750 to read and write information to and from a memory card. A USB interface 730 is included as one example of an interface for enabling connection of peripheral devices, or connection to other devices, such as other portable devices, computers, etc. In various embodiments of the head-mounted display 750, any of various kinds of interfaces may be included to enable greater connectivity of the head-mounted display 750.

A Wi-Fi module 732 is included for enabling connection to the Internet via wireless networking technologies. Also, the head-mounted display 750 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 750 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

The foregoing components of head-mounted display 750 have been described as merely exemplary components that may be included in head-mounted display 750. In various embodiments of the disclosure, the head-mounted display 750 may or may not include some of the various aforementioned components. Embodiments of the head-mounted display 750 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 8:
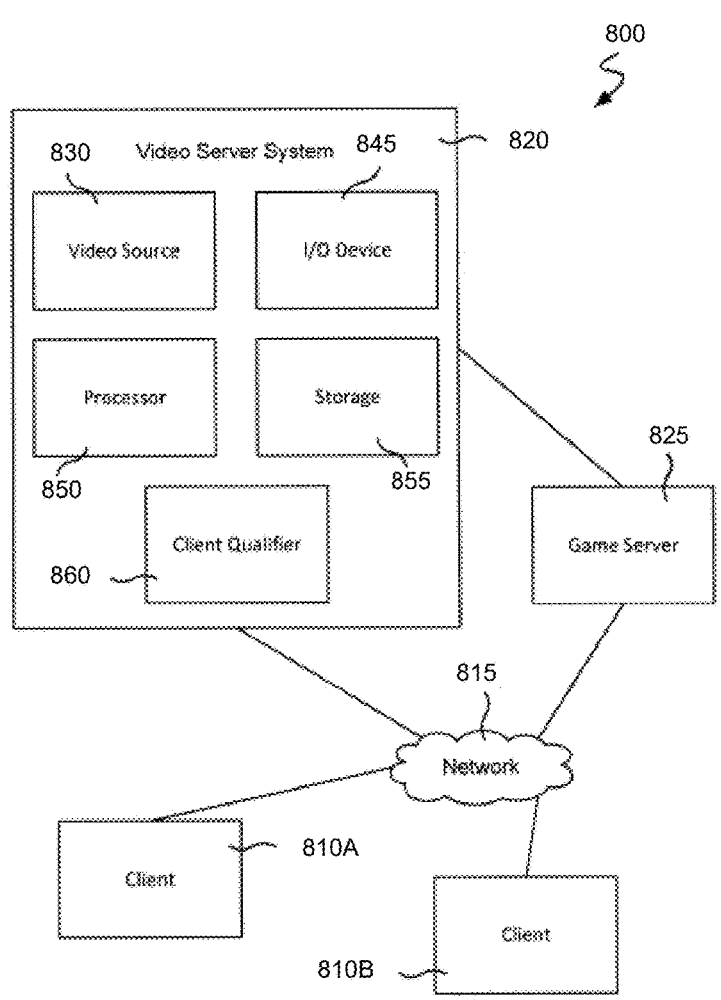
FIG. 8 is a block diagram of a Game System, according to various embodiments of the invention. Game System is configured to provide a video stream to one or more Clients via a Network.

FIG. 8 is a block diagram of a Game System 800, according to various embodiments of the disclosure. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the disclosure.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect gameplay. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multiplayer game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g. a hard drive, an optical drive, or solid state storage. Storage 855 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc. of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method comprising:
   receiving game state data generated from a first instance of a video game executed for a first game play of a first player, wherein the game state data indicates a quest having a starting state, an ending state, and a threshold time to complete a traversal between the starting state and the ending state;
   capturing a snapshot at a point of the quest, wherein the snapshot provides access to the game state data and user data of the first game play to launch a second game play that takes over the first game play at the point of the quest in the first game play where the snapshot was captured thereby enabling playing of the quest;
   generating a marker, wherein the marker is provided for display in a message;
   responsive to receiving the message and in isolation of the first instance of the video game, receiving selection of the marker in the message;
   accessing the snapshot; and
   instantiating a second instance of the video game separate from the first instance using the snapshot to launch the second game play at the point in the first game play where the snapshot was captured, wherein the threshold time is referenced in association to the second instance to determine if a second player of the second game play has accomplished a challenge associated with the quest.

2. The method of claim 1, wherein the second game play is enabled to divert along a new path that is not restricted to an original path taken by the first player in the first game play.

3. The method of claim 1, further comprising:
   receiving one or more parameters defining the quest based on the first game play, wherein the second game play enables playing of the quest based on the one or more parameters.

4. The method of claim 3, wherein receiving the one or more parameters includes:
receiving one or more asset parameters defining the quest.

5. The method of claim 3, wherein receiving the one or more parameters includes:
receiving one or more achievement parameters defining the quest.

6. The method of claim 3, wherein receiving the one or more parameters includes:
receiving a first parameter defining a positive condition; and
receiving a second parameter defining a negative condition, wherein the positive condition is associated with an advantage available in the second game play and the negative condition is associated with a disadvantage imposed in the second game play to complete the traversal between the starting state and the ending state within the threshold time.

7. The method of claim 1, further comprising:
capturing a plurality of snapshots generated from the first game play, wherein each of the snapshots in the plurality of snapshots in the plurality of snapshots is automatically generated and captured and provides access to the game state data and the user data of the first game play to launch a third game play that takes over the first game play at any of a plurality of points in the first game play where a corresponding snapshot is captured.

8. The method of claim 1, further comprising:
capturing a second snapshot generated from the second game play, wherein the second snapshot provides access to second game state data and second user data of the second game play to launch a third game play that takes over the second game play at a second point in the second game play where the second snapshot was captured.

9. A non-transitory computer-readable medium storing a computer program for performing a method, the computer-readable medium comprising program instructions for:
receiving game state data generated from a first instance of a video game executed for a first game play of a first player, wherein the game state data indicates a quest having a starting state, an ending state, and a threshold time to complete a traversal between the starting state and the ending state;
capturing a snapshot at a point of the quest, wherein the snapshot provides access to the game state data and user data of the first game play to launch a second game play that takes over the first game play at the point of the quest in the first game play where the snapshot was captured thereby enabling playing of the quest;
generating a marker, wherein the marker is provided for display in a message;
responsive to receiving the message and in isolation of the first instance of the video game, receiving selection of the marker in the message;
accessing the snapshot; and
instantiating a second instance of the video game separate from the first instance using the snapshot to launch the second game play at the point in the first game play where the snapshot was captured, wherein the threshold time is referenced in association to the second instance to determine if a second player of the second game play has accomplished a challenge associated with the quest.

10. The non-transitory computer-readable medium of claim 9, further comprising program instructions for:
receiving one or more parameters defining the quest based on the first game play, wherein the second game play enables playing of the quest based on the one or more parameters.

11. The non-transitory computer-readable medium of claim 10, wherein the program instructions for receiving the one or more parameters includes:
program instructions for receiving one or more asset parameters defining the quest; or
program instructions for receiving one or more achievement parameters defining the quest.

12. The non-transitory computer-readable medium of claim 10, wherein the program instructions for receiving the one or more parameters includes:
program instructions for receiving a first parameter defining a positive condition; and
program instructions for receiving a second parameter defining a negative condition, wherein the positive condition is associated with an advantage available in the second game play and the negative condition is associated with a disadvantage imposed in the second game play to complete the traversal between the starting state and the ending state within the threshold time.

13. The non-transitory computer-readable medium of claim 9, further comprising:
program instructions for capturing a plurality of snapshots generated from the first game play, wherein each of the snapshots in the plurality of snapshots in the plurality of snapshots is automatically generated and captured and provides access to the game state data and the user data of the first game play to launch a third game play that takes over the first game play at any of a plurality of points in the first game play where a corresponding snapshot is captured.

14. The non-transitory computer-readable medium of claim 9, further comprising:
program instructions for capturing a second snapshot generated from the second game play, wherein the second snapshot provides access to second game state data and second user data of the second game play to launch a third game play that takes over the second game play at a second point in the second game play where the second snapshot was captured.

15. A computer system comprising:
a processor; and
a memory coupled to the processor and having stored therein instructions that, if executed by the computer system, cause the processor to:
receive game state data generated from a first instance of a video game executed for a first game play of a first player, wherein the game state data indicates a quest having a starting state, an ending state, and a threshold time to complete a traversal between the starting state and the ending state;
capture a snapshot at a point of the quest, wherein the snapshot provides access to the game state data and user data of the first game play to launch a second game play that takes over the first game play at the point of the quest in the first game play where the snapshot was captured thereby enabling playing of the quest;
generate a marker, wherein the marker is provided for display in a message;
responsive to receiving the message and in isolation of the first instance of the video game, receive selection of the marker in the message;
access the snapshot; and instantiate a second instance of the video game separate from the first instance using the snapshot to launch the second game play at the point in the first game play where the snapshot was captured, wherein the threshold time is referenced in association to the second instance to determine if a second player of the second game play has accomplished a challenge associated with the quest.

16. The computer system of claim 15, wherein the instructions further cause the processor to:

receive one or more parameters defining the quest based on the first game play, wherein the second game play enables playing of the quest based on the one or more parameters.

17. The computer system of claim 16, wherein receiving the one or more parameters includes:

receiving one or more asset parameters defining the quest; or receiving one or more achievement parameters defining the quest.

18. The computer system of claim 16, wherein receiving the one or more parameters includes:

receiving a first parameter defining a positive condition; and receiving a second parameter defining a negative condition, wherein the positive condition is associated with an advantage available in the second game play and the negative condition is associated with a disadvantage imposed in the second game play to complete the traversal between the starting state and the ending state within the threshold time.

19. The computer system of claim 15, wherein the instructions further cause the processor to:

capture a plurality of snapshots generated from the first game play, wherein each of the snapshots in the plurality of snapshots in the plurality of snapshots is automatically generated and captured and provides access to the game state data and the user data of the first game play to launch a third game play that takes over the first game play at any of a plurality of points in the first game play where a corresponding snapshot is captured.

20. The computer system of claim 15, wherein the instructions further cause the processor to:

capture a second snapshot generated from the second game play, wherein the second snapshot provides access to second game state data and second user data of the second game play to launch a third game play that takes over the second game play at a second point in the second game play where the second snapshot was captured.

* * * * *